US012552653B2

(12) United States Patent
Neubauer et al.

(10) Patent No.: US 12,552,653 B2
(45) Date of Patent: Feb. 17, 2026

(54) BOOM ASSEMBLY

(71) Applicant: Oshkosh Corporation, Oshkosh, WI (US)

(72) Inventors: Mark G. Neubauer, Williamsport, MD (US); Gary L. Myers, Greencastle, PA (US); Wenton S. Miller, Falling Waters, WV (US)

(73) Assignee: OSHKOSH CORPORATION, Oshkosh, WI (US)

( * ) Notice: Subject to any disclaimer, the term of this patent is extended or adjusted under 35 U.S.C. 154(b) by 1297 days.

(21) Appl. No.: 17/193,516

(22) Filed: Mar. 5, 2021

(65) Prior Publication Data

US 2021/0276847 A1 Sep. 9, 2021

Related U.S. Application Data

(60) Provisional application No. 62/986,460, filed on Mar. 6, 2020.

(51) Int. Cl.
*B66F 11/04* (2006.01)
*B21C 37/08* (2006.01)
(Continued)

(52) U.S. Cl.
CPC ........ *B66F 11/046* (2013.01); *B21C 37/0803* (2013.01); *B66F 13/00* (2013.01); *B66F 9/0655* (2013.01)

(58) Field of Classification Search
CPC ...... B66F 9/0655; B66F 11/046; B66F 13/00; B21C 37/08; B21C 37/0803;
(Continued)

(56) References Cited

U.S. PATENT DOCUMENTS 1,959,756 A * 5/1934 Ferm ........................ E04H 12/08 219/93
1,994,716 A * 3/1935 Klemperer .............. B64C 1/065 52/634

(Continued)

FOREIGN PATENT DOCUMENTS

CA 136531 A 10/1911
DE 713152 C1 11/1941

(Continued)

OTHER PUBLICATIONS

Translation of JP_2018130744.*
International Search Report and Written Opinion regarding Appl. No. PCT PCT/US2021/021142, mail date Jun. 22, 2021, 14 pps.

*Primary Examiner* — Colleen M Chavchavadze
(74) *Attorney, Agent, or Firm* — FOLEY & LARDNER LLP

(57) ABSTRACT

At least one embodiment relates to a lift device including a chassis, a series of tractive elements coupled to the chassis, an implement, and a boom coupling the implement to the chassis. The boom includes (a) a first shell including a first sidewall and a first transition coupling a first set of flanges to the sidewall and (b) a second shell including a second sidewall and a second transition coupling a second set of flanges to the sidewall. The first shell abuts the second shell along the first set of flanges and the second set of flanges. The first transition and the second transition extend along a length of the boom. The first transition and the second transition at least partially define a channel. The first shell is coupled to the second shell by a weld positioned within the channel.

20 Claims, 18 Drawing Sheets

(51) Int. Cl.
*B66F 13/00* (2006.01)
*B66F 9/065* (2006.01)

(58) Field of Classification Search
CPC ....... B66C 23/701; B66C 23/64; B66C 23/66; B66C 23/707; E06C 1/12; E06C 1/125; E06C 5/02; E06C 5/04; E06C 5/06
See application file for complete search history.

(56) References Cited

U.S. PATENT DOCUMENTS 2,039,886 A * 5/1936 Cohn ........................ F16L 9/02 138/158
2,228,525 A * 1/1941 Lundskow ................ E06C 1/12 182/69.4
2,521,351 A * 9/1950 Dimmendaal .......... E04F 17/00 285/425
2,912,013 A * 11/1959 Freyholdt ............... F16L 9/003 220/688
3,104,454 A * 9/1963 Sparkia ..................... E04C 3/08 52/309.3
3,802,136 A 4/1974 Eiler et al.
3,931,698 A * 1/1976 Ebersold ............... B66C 23/707 52/118
4,016,688 A * 4/1977 Tiffin .................... B66C 23/701 414/718
4,168,008 A * 9/1979 Granryd ................ B66C 23/701 52/118
5,411,450 A 5/1995 Gratton et al.
6,637,111 B2 10/2003 Sasaki et al.
6,882,917 B2 4/2005 Pillar et al.
7,392,122 B2 6/2008 Pillar et al.
7,756,621 B2 7/2010 Pillar et al.
9,008,913 B1 4/2015 Sears et al.
9,315,210 B2 4/2016 Sears et al.
10,174,868 B2 1/2019 Ditty et al.
10,336,596 B2 7/2019 Puszkiewicz et al.
10,357,995 B2 7/2019 Palmer et al.
10,472,889 B1 11/2019 Betz
10,479,664 B2 11/2019 Linsmeier et al.
10,568,417 B2 * 2/2020 DeGroot .................. A47B 9/20
10,611,347 B1 4/2020 Archer et al.
10,617,900 B1 4/2020 Linsmeier et al.
10,829,355 B2 11/2020 Puszkiewicz et al.
10,850,963 B2 12/2020 Hackenberg et al.
10,858,230 B2 12/2020 Hackenberg et al.
10,968,089 B2 4/2021 Bhatia et al.
10,989,332 B2 4/2021 Ditty et al.
2005/0113996 A1 5/2005 Pillar et al.
2010/0252697 A1 * 10/2010 Koenig ................. B66C 23/701 248/161
2015/0259180 A1 9/2015 Aus et al.
2019/0359460 A1 11/2019 Linsmeier et al.
2020/0071996 A1 3/2020 Betz
2020/0231131 A1 7/2020 Archer et al.
2020/0238115 A1 7/2020 Linsmeier et al.
2020/0290853 A1 9/2020 Neubauer et al.
2020/0290855 A1 9/2020 Bruno et al.
2020/0317488 A1 10/2020 Bafile et al.
2020/0317492 A1 10/2020 Bhatia et al.
2020/0317493 A1 10/2020 Lombardo et al.
2020/0317494 A1 10/2020 Bafile et al.
2021/0039934 A1 2/2021 Hackenberg et al.
2021/0039935 A1 2/2021 Hackenberg et al.
2021/0121340 A1 4/2021 Malcolm et al.

FOREIGN PATENT DOCUMENTS

DE 19549268 C1 7/1997
DE 10138443 A1 2/2003
EP 0 583 552 B1 2/1994
EP 1 955 975 B1 8/2008
GB 0 989 027 A 4/1965
GB 2 103 575 2/1983
GB 2 114 489 8/1983
JP S58-096869 6/1983
JP S63-005873 1/1988
JP 11-9180680 A 3/2000
JP 2004-017105 A 1/2004
JP 2009-090293 A 4/2009
JP 2018-130744 A 8/2018
KR 1020120051373 A 5/2012
KR 101714422 B1 3/2017
RU 2073574 C1 6/1997
RU 186254 U1 1/2019
WO WO-98/22674 A1 5/1998

* cited by examiner

BOOM ASSEMBLY

CROSS-REFERENCE TO RELATED PATENT APPLICATION

This application claims the benefit of U.S. Provisional Patent Application No. 62/986,460, filed Mar. 6, 2020, which is incorporated herein by reference in its entirety.

BACKGROUND

The present application relates generally to a boom assembly for a lift device. More particularly, the present disclosure relates to the construction of a section of a boom assembly for a lift device.

SUMMARY

At least one embodiment relates to a lift device including a chassis, a series of tractive elements coupled to the chassis, an implement, and a boom coupling the implement to the chassis. The boom includes (a) a first shell including a first sidewall and a first transition coupling a first set of flanges to the sidewall and (b) a second shell including a second sidewall and a second transition coupling a second set of flanges to the sidewall. The first shell abuts the second shell along the first set of flanges and the second set of flanges. The first transition and the second transition extend along a length of the boom. The first transition and the second transition at least partially define a channel. The first shell is coupled to the second shell by a weld positioned within the channel.

At least one embodiment relates to a boom including a first shell, a second shell, and a plurality of boom segments. The first shell includes a first sidewall and a first set of flanges coupled to the sidewall. The first set of flanges includes (a) a first flange and (b) a second flange. The second shell includes a second sidewall and a second set of flanges coupled to the sidewall. The second set of flanges includes (a) a third flange and (b) a fourth flange. The first sidewall is coupled to the second sidewall such that the first sidewall and the second sidewall at least partially define an enclosed volume. The first set of flanges and the second set of flanges at least partially define a channel.

At least one embodiment relates to a method of manufacturing a lift device including forming a first shell and a second shell. The first shell includes a first sidewall and a first flange coupled to the sidewall. The first flange is disposed in perpendicular orientation away from the first sidewall. The second shell includes a second sidewall and a second flange coupled to the sidewall. The second flange is disposed in a perpendicular orientation away from the second sidewall. The first flange and the second flange are positioned in a generally horizontal orientation. The first flange and the second flange at least partially define a channel. The first shell and the second shell are coupled together by a weld positioned within the channel.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a lift device includes a work implement coupled to a chassis by a boom assembly. The boom assembly is pivotally coupled to the chassis to facilitate raising and lowering of the work implement relative to the ground. The boom assembly includes multiple telescoping sections and one or more actuators configured to move each individual section relative to one another, providing an operator with control over the extension of the boom assembly. In some embodiments, the boom assembly is coupled to a turntable to facilitate further rotation of the boom assembly about a vertical axis.

In other boom assemblies, adjacent shells are coupled to one another using backer plates to form an enclosed volume. Specifically, a backer plate is tack welded to an inner face of a first shell, and the second shell is laid against the backer plate and welded to the backer plate and the first shell. This requires two welding processes for each connection.

Sections of the boom assembly described herein includes a series of shells (e.g., an upper shell and a lower shell) that are coupled to one another to define an enclosed volume that contains the subsequent boom section. Each shell defines a pair of flanges extending inward or outward from a sidewall of the shell. The flanges are placed against one another, defining a groove therebetween that extends along a length of the boom section. A weld extends along the length of this groove, coupling the shells to one another. Accordingly, the need for manufacturing a separate backer plate is eliminated relative to other boom designs. Additionally, each connection between the upper shell and the lower shell requires only a single weld, as eliminating the need for a second weld to attach the backer plate. In some embodiments, the flanges are placed near a horizontal neutral axis of the boom section to minimize the effect of bending stresses on the weld. The flanges may also be offset from a vertical neutral axis of the boom section, improving the strength of the boom section for bending about the vertical neutral axis. The shapes of the flanges and their positions relative to the neutral axes of the boom section improve the strength of the boom section relative to backer plate designs. Accordingly, the weight and material cost of the boom section can be reduced while maintaining the desired strength.

Figure 1:
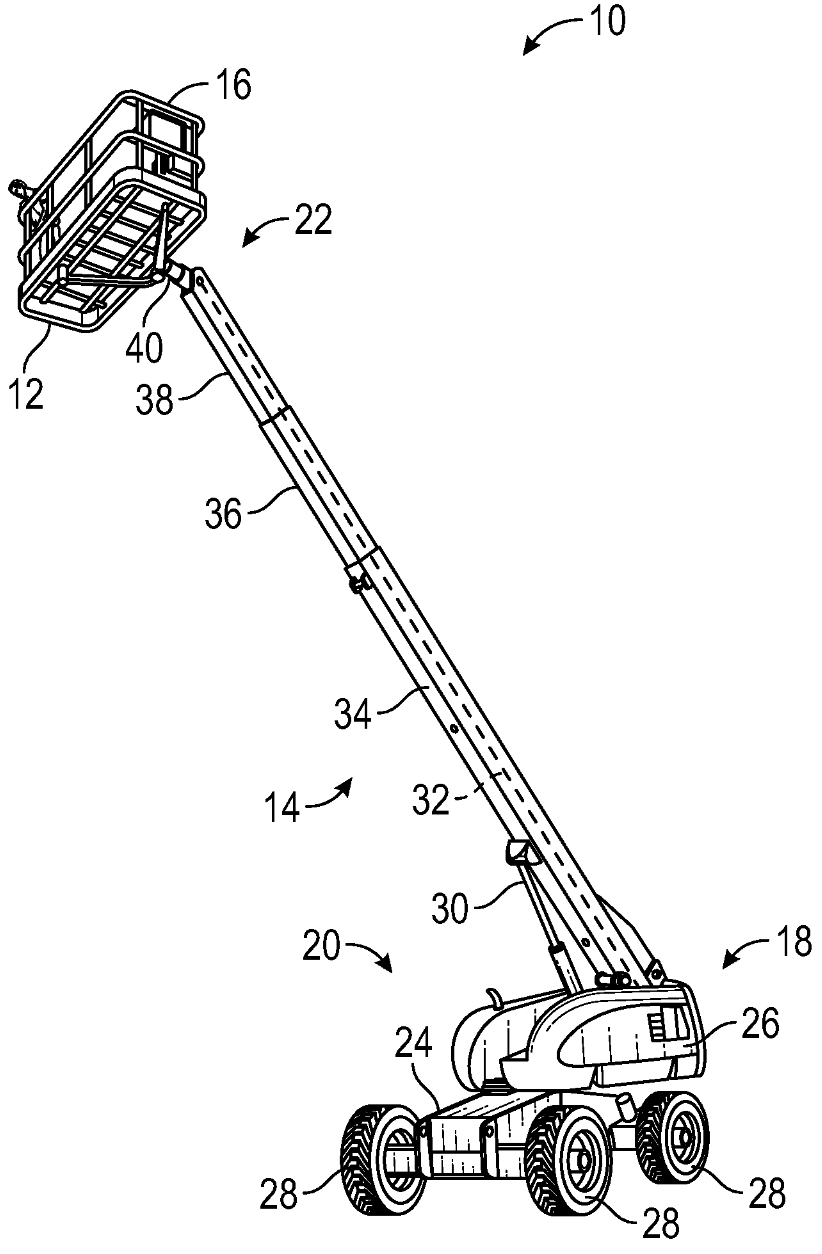
FIG. 1 is a perspective view of a lift device including a boom assembly, according to exemplary embodiment.

According to the exemplary embodiment shown in FIG. 1, a lift device (e.g., an aerial work platform, a telehandler, etc.), shown as lift device 10, includes a chassis or ground console, shown as chassis 20, and a work implement (e.g., a work platform, forks, a bucket, etc.), shown as platform 12. The platform 12 is coupled to the chassis 20 by a boom assembly, shown as boom 14. According to an exemplary embodiment, platform 12 supports one or more workers. In some embodiments, the lift device 10 includes an accessory or tool, shown as welder 16, coupled to the platform 12 for use by the worker. In other embodiments, the platform 12 is equipped with other tools for use by a worker, including pneumatic tools (e.g., impact wrench airbrush, nail guns, ratchets, etc.), plasma cutters, and spotlights, among other alternatives. In other embodiments, the lift device 10 includes a different work implement coupled to the boom 14 (e.g., a saw, drill, jackhammer, lift forks, etc.) in place of or addition to the platform 12. Accordingly, the lift device 10 may be configured as a different type of lift device, such as a telehandler, a vertical lift, etc.

The boom 14 has a first or proximal end 18 pivotally coupled to the chassis 20 and a second or distal end 22 opposite the proximal end 18. The distal end 22 is pivotally coupled to the platform 12. By pivoting the boom 14 at the proximal end 18, the platform 12 may be elevated or lowered to a height above or below a portion of the chassis 20. The boom 14 has a plurality of telescoping segments that allow the distal end 22 and the platform 12 to be moved closer to or away from the proximal end 18 and the chassis 20.

As shown in FIG. 1, the chassis 20 includes a chassis, base, or frame, shown as base frame 24. The base frame 24 is coupled to a turntable 26. According to exemplary embodiment, the proximal end 18 of the boom 14 is pivotally coupled to the turntable 26. According to an alternative embodiment, the chassis 20 does not include a turntable 26 and the boom 14 is coupled directly to the base frame 24 (e.g., the boom 14 may be provided as part of a telehandler). According to still another alternative embodiment, the boom 14 is incorporated as part of an articulating boom lift that includes multiple sections coupled to one another (e.g., a base section coupled to the chassis 20, an upper section coupled to the platform 12, and one or more intermediate sections coupling the base section to the upper section, etc.).

Figure 2:
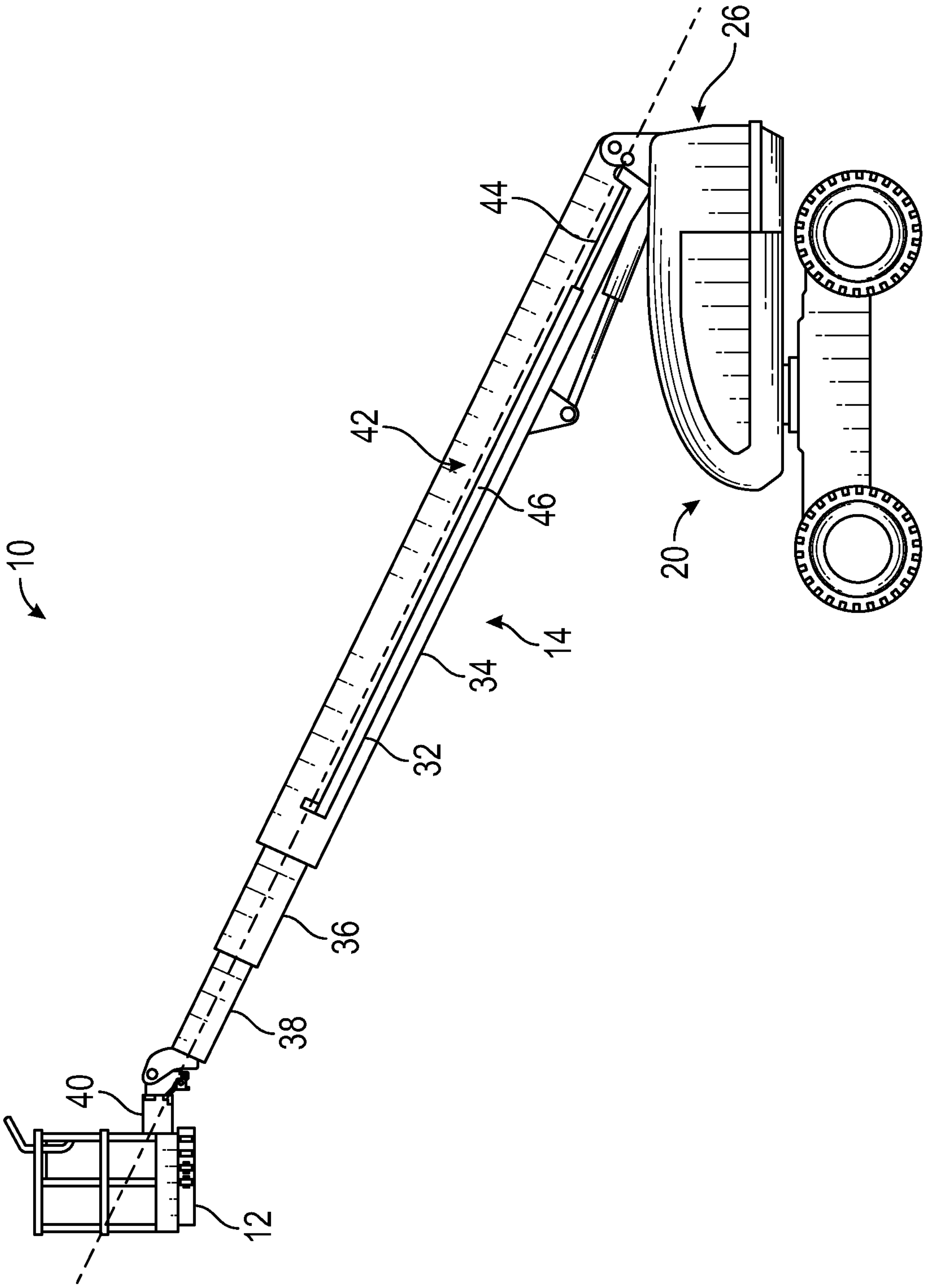
FIG. 2 is a right side view of the lift device of FIG. 1 with the boom assembly in a retracted position.

As shown in FIGS. 1 and 2, the lift device 10 is mobile and the base frame 24 includes tractive elements, shown as wheel and tire assemblies 28. The wheel and tire assemblies 28 may be driven using a prime mover and steered to maneuver the lift device 10. In other embodiments, the base frame 24 includes other devices to propel or steer the lift device 10 (e.g., tracks). In still other embodiments, the lift device 10 is a trailer that is towed by another vehicle, and the base frame 24 includes one or more wheels or elements configured to support the lift device 10. In still other embodiments, the lift device 10 is a stationary device and the base frame 24 lacks any wheels or other elements to facilitate the movement of the lift device 10 and may instead include legs or other similar structures that facilitate stationary support of the lift device 10.

The turntable 26 is coupled to the base frame 24 such that the turntable 26 may be rotated relative to the base frame 24 about a vertical axis of rotation (e.g., by a motor). According to an exemplary embodiment, the chassis 20 houses one or more pumps and/or motors that power one or more functions of the lift device 10 (e.g., extension and/or movement of the boom 14 and the platform 12, rotation of the turntable 26, rotation of the wheel and tire assemblies 28, etc.). The pumps and/or motors may drive the movement directly, or may provide electrical energy or pressurized hydraulic fluid to another actuator. The lift device 10 may include an onboard engine (e.g., a gasoline or diesel engine), may receive electrical energy from an external source through a tether (e.g., a cable, a cord, etc.), may include an on-board generator set to provide electrical energy, may include a hydraulic pump coupled to a motor (e.g., an electric motor, an internal combustion engine, etc.), and/or may include an energy storage device (e.g., battery).

According to an exemplary embodiment, the turntable 26 includes an internal structure (e.g., one or more bosses coupled to a pin, etc.) configured to support the boom 14. The internal structure may interface with the proximal end 18 of the boom 14 to pivotally couple the boom 14 to the chassis 20. A lift actuator, shown as hydraulic cylinder 30, is coupled between the turntable 26 and the boom 14. According to an exemplary embodiment, the hydraulic cylinder 30 extends or retracts to raise or lower the boom 14 (e.g., to rotate the distal end 22 of the boom 14 relative to the turntable 26). In other embodiments, the hydraulic cylinder is replaced with or additionally includes another type of actuator (e.g., an electric motor, a lead screw, a ball screw, an electric linear actuator, a pneumatic cylinder, etc.).

According to an exemplary embodiment, the boom 14 is a telescoping boom including a series of segments or sections that are configured to translate relative to one another along a longitudinal axis 32. The longitudinal axis 32 extends along the length of the boom 14 between the proximal end 18 and the distal end 22. As shown in FIG. 1, the boom 14 includes three sections: a first or base boom section 34, a second, middle, or intermediate boom section 36, and a third, upper, or fly boom section 38. The base boom section 34 is the most proximal section, and the fly boom section 38 is the most distal section, with the intermediate boom section 36 extending between and coupling the base boom section 34 and fly boom section 38. The base boom section 34 is coupled to the turntable 26 and the fly boom section 38 is coupled to the platform 12.

According to an exemplary embodiment, the base boom section 34, the intermediate boom section 36, and the fly boom section 38 have tubular cross sectional shapes (e.g., to facilitate receiving boom sections within one another). The base boom section 34, the intermediate boom section 36, and the fly boom section 38 may have a variety of cross sectional shapes (e.g., hexagonal, round, square, pentagonal, etc.). While the embodiment shown in FIGS. 1 and 2 has three boom segments, in other embodiments, the boom 14 includes more or fewer segments. As shown in FIGS. 1 and 2, the boom 14 further includes a linkage, shown as connecting linkage 40, which couples the platform 12 to the fly boom section 38. According to an exemplary embodiment, the connecting linkage 40 includes a rotator (e.g., a rotating joint or motor, a hydraulic cylinder, etc.) that drives relative rotation between the boom 14 and the platform 12. According to an exemplary embodiment, the connecting linkage 40 includes a jib (e.g., a four bar linkage) that facilitates translation between the boom 14 and the platform 12. According to an exemplary embodiment, the connecting linkage 40 includes both a rotator and a jib. Such connecting linkages 40 may facilitate the platform 12 remaining level as the boom 14 is raised or lowered. The connecting linkage 40 may be controlled by a self-leveling system including a slave cylinder (e.g., the slave cylinder may operate based on the position of the hydraulic cylinder 30). In other embodiments, movement of the connecting linkage 40 is otherwise controlled (e.g., by manual or computer control of a hydraulic or electric actuator (e.g., a cylinder, a motor, etc.).

Referring still to the exemplary embodiment shown in FIG. 2, the base boom section 34, the intermediate boom section 36, and the fly boom section 38 move relative to each other along the longitudinal axis 32 as the boom 14 extends or retracts. In one embodiment, with the base boom section 34 held stationary, the intermediate boom section 36 moves at a constant rate relative to the base boom section 34 and the fly boom section 38 moves at a constant rate relative to the intermediate boom section 36 (i.e. the relative movement occurs at a fixed ratio). The lift device 10 includes an actuator, shown as cylinder 42. In some embodiments, the cylinder 42 is positioned within the boom 14 to extend or retract the boom 14. The cylinder 42 may include a rod 44 and an outer barrel 46. The cylinder 42 extends along the length of the boom 14 and extends through the end of the intermediate boom section 36. In other embodiments, one or more actuators are otherwise arranged to control relative movement of the sections of the boom 14. One or more sections of the boom 14 may be coupled to one another through one or more tensile members (e.g., cables) and/or pulleys to control relative motion between the sections. In other embodiments, the boom 14 includes one or more boom sections that do not telescope relative to one another.

Figure 3:
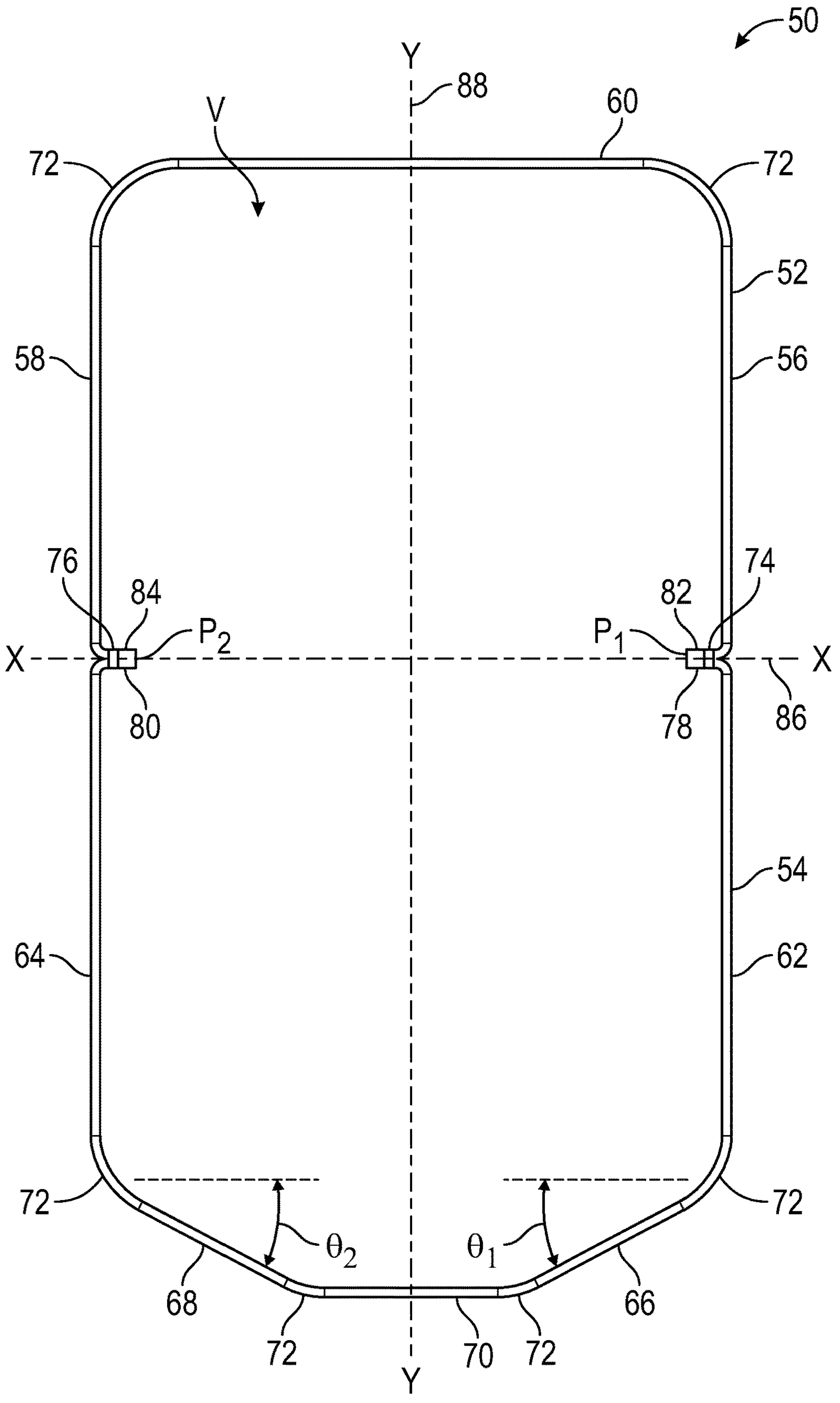
FIG. 3 is a front section view of a boom section of a boom assembly, according to exemplary embodiment.
Figure 4:
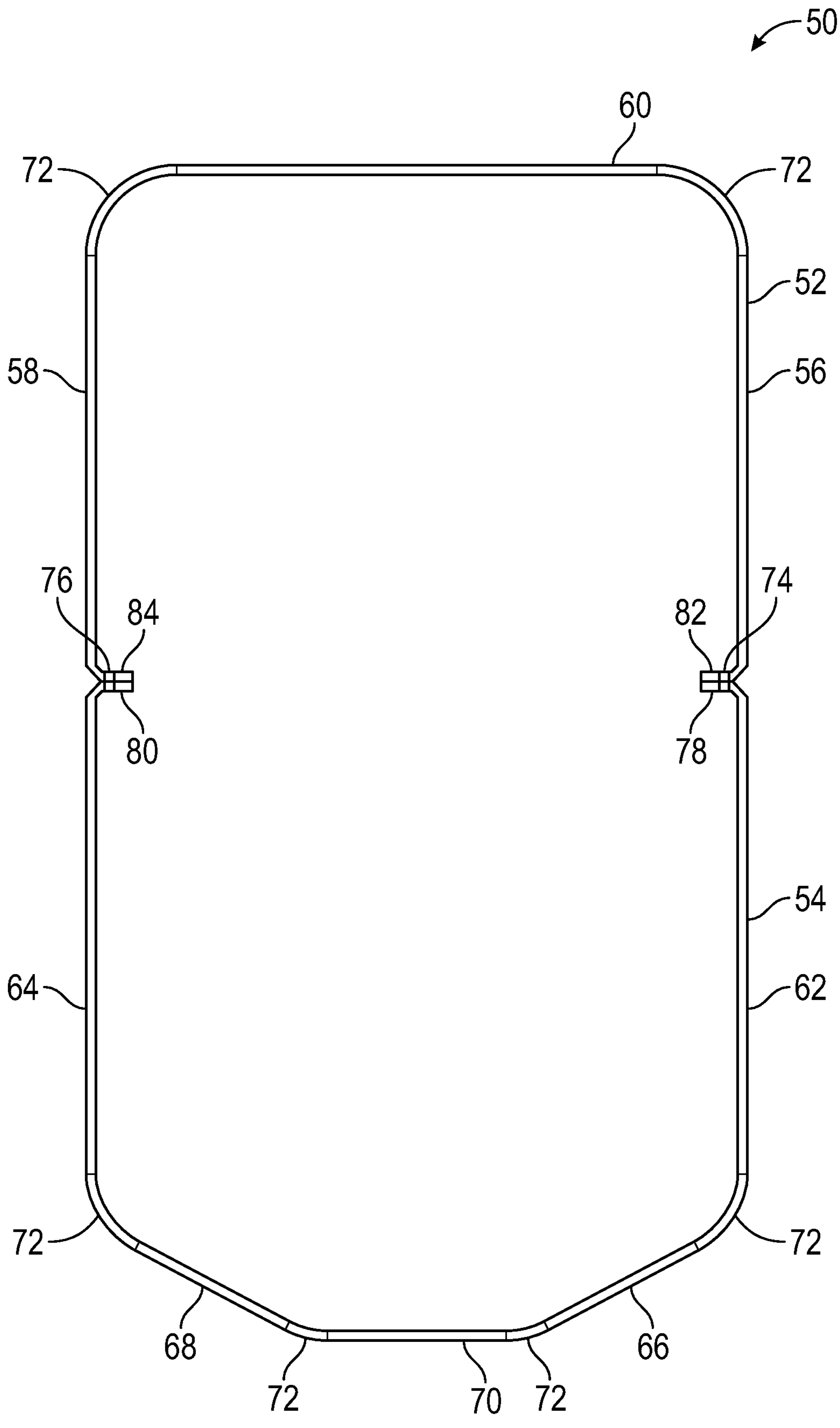
FIG. 4 is a front section view of a boom section of a boom assembly, according to exemplary embodiment.

Referring to FIGS. 3 and 4, a cross-sectional view of a segment or section of a boom, shown boom section 50, is shown according to an exemplary embodiment. The boom section 50 may be the base boom section 34, the intermediate boom section 36, the fly boom section 38, or a section of another boom. The boom section 50 includes a plurality of sidewalls that form a tubular shape containing an enclosed volume V. As shown, the boom section 50 includes a first portion, shown as upper shell 52, and a second portion, shown as lower shell 54, that are coupled to one another to define the enclosed volume V. According to an alternative embodiment, tubular boom section 50 may have other a variety of sectional shapes (e.g., rectangular, round, square, pentagonal, etc.). The upper shell 52 and the lower shell 54 are configured to carry structural loading applied to the boom 14 (e.g., a weight supported by the platform 12, etc.). When a weight is applied to the platform 12, the upper shell 52 is configured to be primarily in tension and the lower shell 54 is configured to be primarily in compression. In other loading arrangements (e.g., the boom 14 is resting on another object), the upper shell 52 may be in compression and the lower shell 54 may be in tension. In some embodiments, the upper shell 52 and the lower shell 54 each extend along substantially the entire length of the boom section 50. In other embodiments, the upper shell 52 extends along only a portion of the length of the lower shell 54 or vice versa (e.g., a portion of the tubular boom section 50 may have an increased or decreased thickness or include another type of upper shell 52).

Referring still to the exemplary embodiment shown in FIGS. 3 and 4, the boom 14 includes the upper shell 52 and the lower shell 54. The upper shell 52 and the lower shell 54 each define a width of the boom 14 (i.e., extending parallel to the horizontal neutral axis 86 shown in FIG. 3). The upper shell 52 and the lower shell 54 together define a height of the boom (i.e., extending parallel to the vertical neutral axis 88 shown in FIG. 3).

Referring still to the exemplary embodiment shown in FIGS. 3 and 4, the upper shell 52 includes a series of sidewalls, shown as sidewall 56, sidewall 58, and top wall 60. The sidewall 56 and the sidewall 58 are substantially vertical. The top wall 60 extends laterally between the sidewall 56 and the sidewall 58 (e.g., such that the top wall 60 is substantially horizontal). The lower shell 54 includes a series of sidewalls, shown as sidewall 62, sidewall 64, angled sidewall 66, angled sidewall 68, and bottom wall 70. The sidewall 62 and the sidewall 64 are substantially vertical. The angled sidewall 66, the angled sidewall 68, and the bottom wall 70 all extend between the sidewall 62 and the sidewall 64, with the bottom wall extending between the angled sidewall 66 and the angled sidewall 68. The angled sidewalls are angled relative to a horizontal axis (e.g., the horizontal neutral axis 86). Specifically, the angled sidewall 66 is oriented at an angle $\theta_1$ relative to a horizontal axis, and the angled sidewall 68 is oriented at an angle $\theta_2$ relative to a horizontal axis. The angled sidewalls 66 and 68 may improve the resistance of the lower shell 54 to buckling. In some embodiments, the angle $\theta_1$ and the angle $\theta_2$ are substantially equal. In some embodiments, angle $\theta_1$ and angle $\theta_2$ are angles other than 0 degrees or a multiple of 90 degrees (e.g., 90 degrees, 180 degrees, 270 degrees, etc.). In some embodiments, the angle $\theta_1$ and the angle $\theta_2$ are approximately 30 degrees. In other embodiments, the angle $\theta_1$ and the angle $\theta_2$ differ from one another and/or have a different magnitude. The bottom wall 70 extends laterally between the angled sidewall 68 and the angled sidewall 66 (e.g., such that the bottom wall 70 is substantially horizontal). In other embodiments, the upper shell and/or the lower shell 54 include additional angled sidewalls (e.g., similar to the angled sidewall 66 or the angled sidewall 68, at different angles or positions, etc.).

As shown in FIGS. 3 and 4, (a) the sidewall 56 is coupled to the top wall 60, (b) the top wall 60 is coupled to the sidewall 58, (c) the sidewall 62 is coupled to the angled sidewall 66, (d) the angled sidewall 66 is coupled to the bottom wall 70, (e) the bottom wall 70 is coupled to the angled sidewall 68, (f) and the angled sidewall 68 is coupled to the sidewall 64 at bends, edges, corners, or transition portions, shown as corners 72. Specifically, the sidewalls may be fixedly coupled to one another. As shown, the corners 72 are bends formed in a continuous piece of material. Specifically, the sidewall 56, the top wall 60, and the sidewall 58 are formed as a single, continuous piece from a single sheet of bent or otherwise formed (e.g., stamped) material. Similarly, the sidewall 62, the angled sidewall 66, the bottom wall 70, the angled sidewall 68, and the sidewall 64 are formed as a single, continuous piece from a single sheet of bent or otherwise formed material. Each corner 72 is configured as a radiused bend, providing structural rigidity to the boom 14. As shown, the corners 72 of the upper shell 52 are larger (e.g., longer, have a greater radius, etc.) than the corners 72 of the lower shell 54. In other embodiments, one or more of pieces of material are welded to form a single, continuous piece. In other embodiments, the boom 14 may be defined by more or fewer walls. By way of example, the angled sidewalls 66, 68 may be omitted, and the bottom wall 70 may be directly coupled to the sidewalls 62, 64.

Referring still to the exemplary embodiment shown in FIGS. 3 and 4, the upper shell 52 includes a first flange, shown as flange 74, and a second flange, shown as flange 76.

The flange 74 and the flange 76 are positioned at the bottom end of the upper shell 52. Specifically, the flange 74 is directly coupled to the sidewall 56, and the flange 76 is directly coupled to the sidewall 58. The flanges 74, 76 may formed as part of the same continuous piece as the sidewalls 56, 58. The lower shell 54 includes a third flange, shown as flange 78, and a fourth flange, shown as flange 80. The flange 78 and the flange 80 are positioned at the top end of the lower shell 54. Specifically, the flange 78 is directly coupled to the sidewall 62, and the flange 80 is directly coupled to the sidewall 64. The flanges 78, 80 may formed as part of the same continuous piece as the sidewalls 62, 64.

The upper shell 52 and the lower shell 54 each extend along the length of the boom section 50. In some embodiments, one or more (e.g., all) of the sidewalls and the flanges of the boom section 50 extend parallel to the longitudinal axis 32 of the boom 14 shown in FIG. 1. The sidewalls and the flanges of the boom section 50 may extend the entire length of the boom section, or one or more of the sidewalls and the flanges may extend only partway along the length of the boom section 50. By way of example, the flange 74 may be cut such that the ends of the flange 74 are offset from the ends of the boom section 50. By way of another example, the flange 74 may be cut into multiple segments such that the boom section 50 includes multiple flanges 74 in line with one another and spaced along the length of the boom section 50.

A first set of flanges 82, including the flange 74 and the flange 78, forms a first connection or joint between the upper shell 52 and the lower shell 54. The flange 74 and the flange 78 engage one another along a contact plane $P_1$. A second set of flanges 84, including the flange 76 and the flange 80, forms a second connection between the upper shell 52 and the lower shell 54. The flange 76 and the flange 80 engage one another along a contact plane $P_2$. As shown in FIGS. 3 and 4, the first set of flanges 82 and the second set of flanges 84 extend inward from the walls of the boom 14 (i.e., are positioned internally). Specifically, the first set of flanges 82 and the second set of flanges 84 extend horizontally such that the contact plane $P_1$ and the contact plane $P_2$ are horizontal planes and aligned with one another. In other embodiments, the contact plane $P_1$ and/or the contact plane $P_2$ are not aligned with one another (e.g., are offset from one another, are angled relative to one another, etc.). In other embodiments, the first set of flanges 82 and/or the second set of flanges 84 extend outward from the walls of the boom 14 (i.e., be positioned externally).

During normal operation, the boom 14 may experience various bending stresses. The boom section 50 defines a horizontal axis, or X-X axis, shown as horizontal neutral axis 86. When a vertical force is applied to the boom section 50, substantially no bending stress is experienced by the boom section 50 at the horizontal neutral axis 86. The boom section 50 further defines a vertical or Y-Y axis, shown as vertical neutral axis 88. When a lateral force is applied to the boom section 50, substantially no bending stress is experienced at the vertical neutral axis 88. In the embodiment shown, the contact plane $P_1$ and the contact plane $P_2$ are aligned with the horizontal neutral axis 86. In other embodiments, one or both of the contact plane $P_1$ and the contact plane $P_2$ are not aligned with (e.g., angled relative to, offset from, etc.) the horizontal neutral axis 86. The weight of the platform 12, the boom 14, and any objects or personnel supported by the boom 14 may produce bending stresses about the horizontal neutral axis 86. Specifically, the upper shell 52 may be mainly in tension during such loading, whereas the lower shell 54 may be mainly in compression. Operation of the lift device 10 on a sloped surface (e.g., on a hill) may cause the boom 14 to extend at an angle relative to the direction of gravity, introducing stresses about the vertical neutral axis 88. Similarly, rotation of the turntable 26 may produce bending stresses about the vertical neutral axis 88 (e.g., due to the inertia of the platform 12 and objects or personnel supported by the platform 12). According to an exemplary embodiment, the location, shape, and/or size of the first set of flanges 82 and the second set of flanges 84 are configured to maximize the strength of the boom and/or to minimize stresses experienced by the connections between the flanges.

As shown, the horizontal neutral axis 86 extends through the center of the first set of flanges 82 and the second set of flanges 84 (i.e., the first set of flanges 82 and the second set of flanges 84 are centered about and aligned with the horizontal neutral axis 86, the contact plane $P_1$ and the contact plane $P_2$ are aligned with the horizontal neutral axis 86). At the horizontal neutral axis 86, there exists a lower amount of bending stress than areas further from the horizontal neutral axis 86. Advantageously, placing the first set of flanges 82 and the second set of flanges 84 at or near the horizontal neutral axis 86 reduces the stresses experienced by the connections between the flanges. In some embodiments, these connections are welded connections. Accordingly, this arrangement reduces the stresses experienced by theses welds.

In some embodiments, the vertical neutral axis 88 is the neutral axis for bending caused by lateral forces experienced by the boom 14. As shown, the first set of flanges 82 and the second set of flanges 84 are offset from the vertical neutral axis 88 and extend perpendicular towards the vertical neutral axis 88. This arrangement maximizes the amount of material positioned away from the vertical neutral axis 88, increasing the buckling strength of the boom 14 and thus reducing the bending stresses in the boom 14 (e.g., providing increased stiffness to a side plate) and/or deflections of the boom caused by lateral forces.

Referring next to the exemplary embodiment shown in FIGS. 3 and 4, the boom 14 is symmetrical about the vertical neutral axis 88. The boom 14 is also asymmetrical about the horizontal neutral axis 86. In alternate embodiments, the boom 14 is asymmetrical about the vertical neutral axis 88 (e.g., the first set of flanges 82 are the second set of flanges 84 are not positioned adjacent to each other, etc.). In another alternate embodiment, the boom 14 is symmetrical about the horizontal neutral axis 86 (e.g., the upper shell 52 is similar to the lower shell 54).

Figure 5:
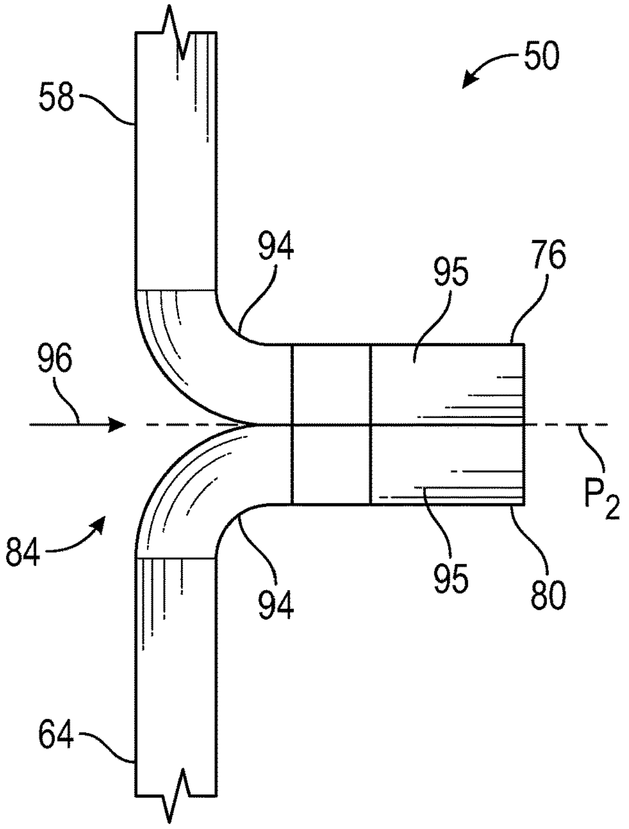
FIG. 5 is a detailed section view of a set of flanges of the boom section of FIG. 3.
Figure 6:
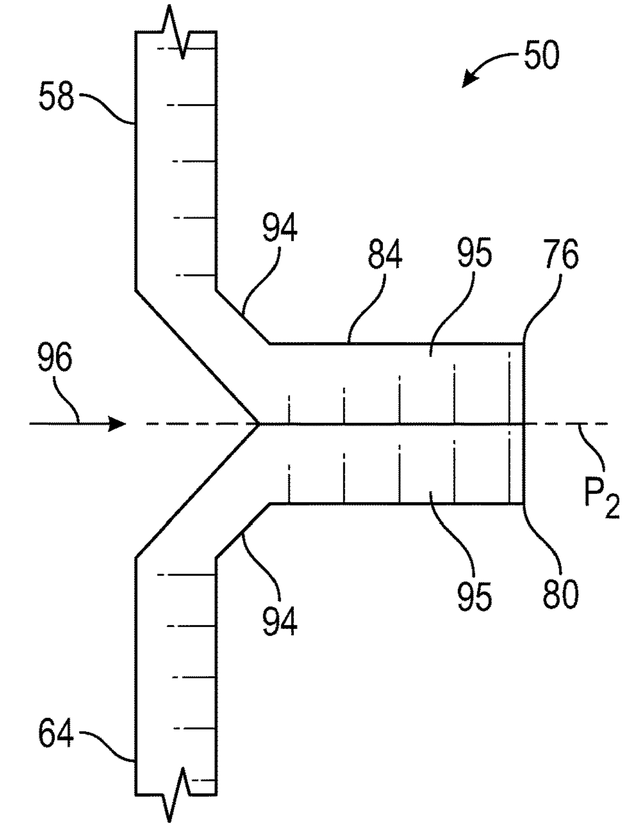
FIG. 6 is a detailed section view of a set of flanges of the boom section of FIG. 4.

Referring next to the exemplary embodiment shown in FIG. 5, a detailed view of the boom section 50 shows the second set of flanges 84, according to exemplary embodiment. Any flanges described herein may have a similar construction to that of the second set of flanges 84. The flange 76 includes a bend, edge, corner, or transition portion, shown as transition portion 94, that couples a flat portion 95 to the sidewall 58. Similarly, the flange 80 includes a bend, edge, corner, or transition portion, shown as transition portion 94, that couples a flat portion 95 to the sidewall 64. In the embodiment shown in FIG. 5, the transition portion 94 is a curved portion. In such an embodiment, the transition portion 94 forms a curved shape. The transition portion 94 may have a substantially constant radius of curvature. In an alternative embodiment shown in FIG. 6, the transition portion 94 is substantially flat. In such an embodiment, the transition portion 94 forms a V shape.

Referring again to FIG. 5, the flange 76 and the flange 80 cooperate to define a pocket, slot, channel, notch, groove, or recess, shown as notch 96. Specifically, the notch 96 is defined between the transition portions 94 of the flanges 76, 80. The notch 96 extends longitudinally along the length of the boom section 50. At the end of the notch 96 (e.g., the end closest to the enclosed volume V), the flange 76 engages the flange 80. Specifically, the flange 76 engages the flange 80 along the contact plane $P_2$. In some embodiments, flat surfaces of the flat portions 95 engage one another (e.g., the flange 76 engages the flange 80 to form a plane of contact points coplanar with the contact plane $P_2$). In other embodiments, such as the embodiment shown in FIG. 7, the flat portions 95 are angled or bent away from one another slightly such that only a portion of the surface of the flange 76 contacts the flange 80 (e.g., the flange 76 engages the flange 80 to form a line of contact points contained by the contact plane $P_2$). In such an embodiment, the flanges may still be substantially perpendicular to the corresponding sidewalls, and the contact plane $P_2$ may be approximately centered between the flat portions 95.

Figure 7:
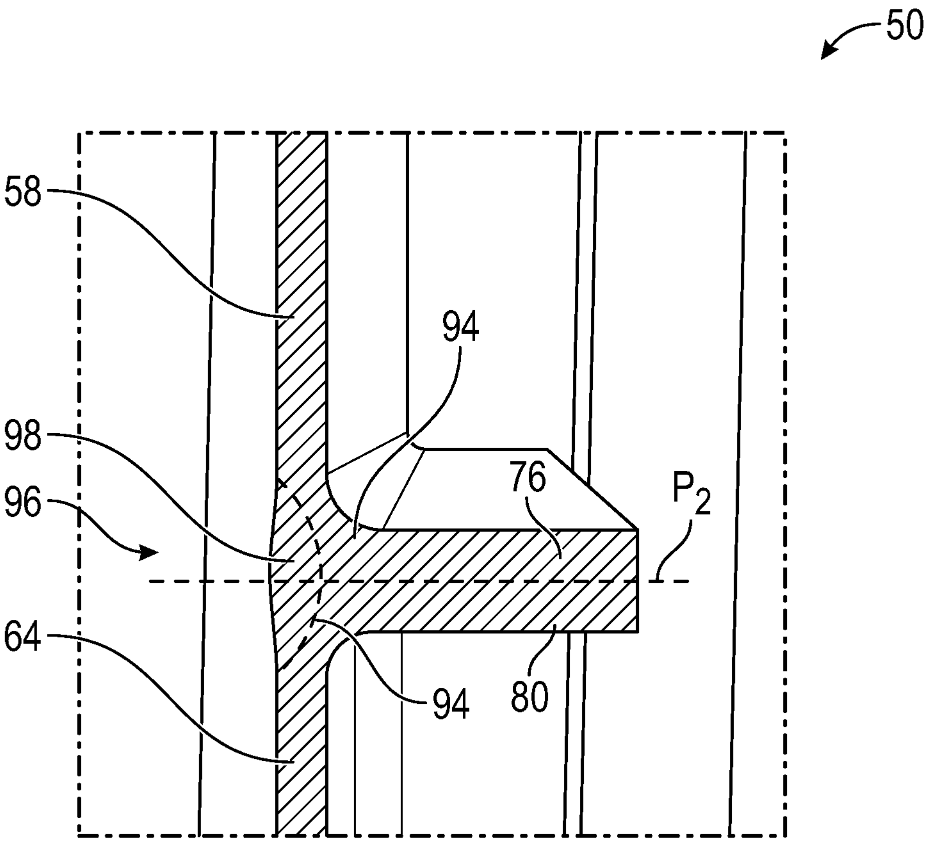
FIG. 7 is a detailed section view of a set of flanges of a boom section coupled to one another by a weld, according to an exemplary embodiment.
Figure 8:
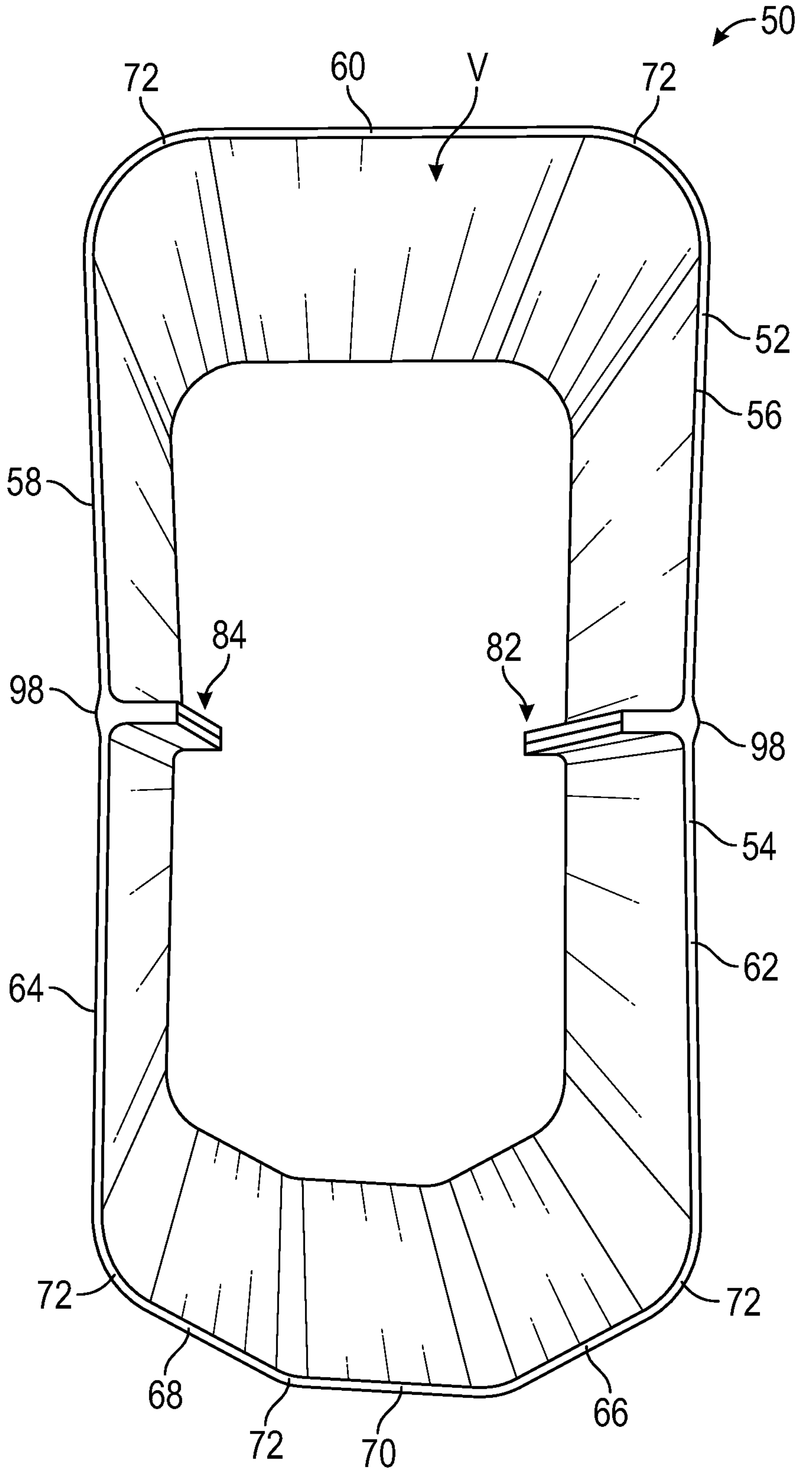
FIG. 8 is a front section view of the boom section of FIG. 7.

Referring next to the exemplary embodiment shown in FIGS. 7 and 8, the upper shell 52 and the lower shell 54 are coupled together by a weld 98 extending along the length of the notch 96. The weld 98 extends longitudinally along the length of the boom 14. The weld 98 at least partially fills the notch 96, forming a continuous connection between the transition portions 94. Because the notch 96 is positioned on an exterior surface of the boom section 50 (i.e., the notch 96 faces away from the enclosed volume V of the boom section 50), the weld 98 can be easily applied by an operator or machine positioned outside the boom section 50. Additionally, this arrangement may minimize the risk of unintentionally melting through the entire thickness of the material, even when using thin materials. In other embodiments, another type of joining material (e.g., adhesive) at least partially fills the notch 96 to couple the flanges to one another. In some embodiments, the upper shell 52 and the lower shell 54 may be coupled by an alternate method (e.g., adhesive, rivet, spot weld, etc.).

Other types of boom assemblies utilize a backer plate or backer strip to assemble multiple shells together into a boom section. Specifically, the backer plate is placed on an interior surface of a first sidewall of a first shell and welded (e.g., tack welded) in place. A second sidewall of a second shell is placed such that an end of the second sidewall is adjacent an end of the first sidewall and an interior surface of the second sidewall abuts the backer plate, and the second sidewall is welded to the backer plate and/or the first sidewall. This requires two separate welding operations for each connection and the manufacture of an additional backer plate.

The arrangements of the first set of flanges 82 and the second set of flanges 84 permits coupling the upper shell 52 and the lower shell 54 with only a single weld 98 on each side of the boom. This reduces the cost of the boom section 50 relative to other booms by reducing the total number of welding manufacturing operations. Additionally, the arrangement of the first set of flanges 82 and the second set of flanges 84 permits coupling the upper shell 52 and the lower shell 54 without the user of a backer plate, even when using thin materials. This reduces the cost of the boom section 50 relative to other booms by reducing the total number of parts.

The construction of the boom section 50 facilitates increased strength (e.g., resistance to bending stresses) relative to other types of boom sections having similar weights. Because the flanges are centered or near centered on the horizontal neutral axis 86, the notch 96 and the weld 98 are also centered or near centered along the horizontal neutral axis 86, which is the neutral axis for vertical loads. This position near the neutral axis causes the weld 98 to experience minimal bending stresses. Additionally, because the width of the boom section 50 is smaller than the height of the boom section 50, the left and right sidewalls experience relatively large bending stresses in response to lateral loading. The flanges are offset from and arranged perpendicular to the vertical neutral axis 88, maximizing their contribution to the buckling strength of the boom section 50 and thereby reducing stresses caused by lateral loadings. This reduction in stress reduces the potential for buckling of the vertical sidewalls. This position and arrangement provides a better contribution to the buckling strength than backing plates of other types of booms (e.g., a boom having a backing plate extending parallel to a side wall) having similar weights (e.g., provides a better strength-to-weight ratio than other types of booms). This increased buckling strength may reduce the amount of material required to support a given load (e.g., using a thinner material to form the boom section 50). This may also permit having narrower boom sections without introducing the possibility for failure due to lateral loads. Having the capability to use thinner materials for the boom 14 has many benefits including smaller, lighter, and less expensive components; lighter ground contact pressures of the tires for better floatation on soft terrain as well as reduced interior floor loading; increased battery performance and/or fuel efficiency; and ease of shipping.

Referring to FIGS. 9-16, boom sections are shown according to a variety of alternate embodiments. In each of these embodiments, the boom sections may be substantially similar to the boom section 50 of FIG. 3, except as otherwise stated. Any features described herein with respect to the various boom sections may be combined in other embodiments.

Figure 9:
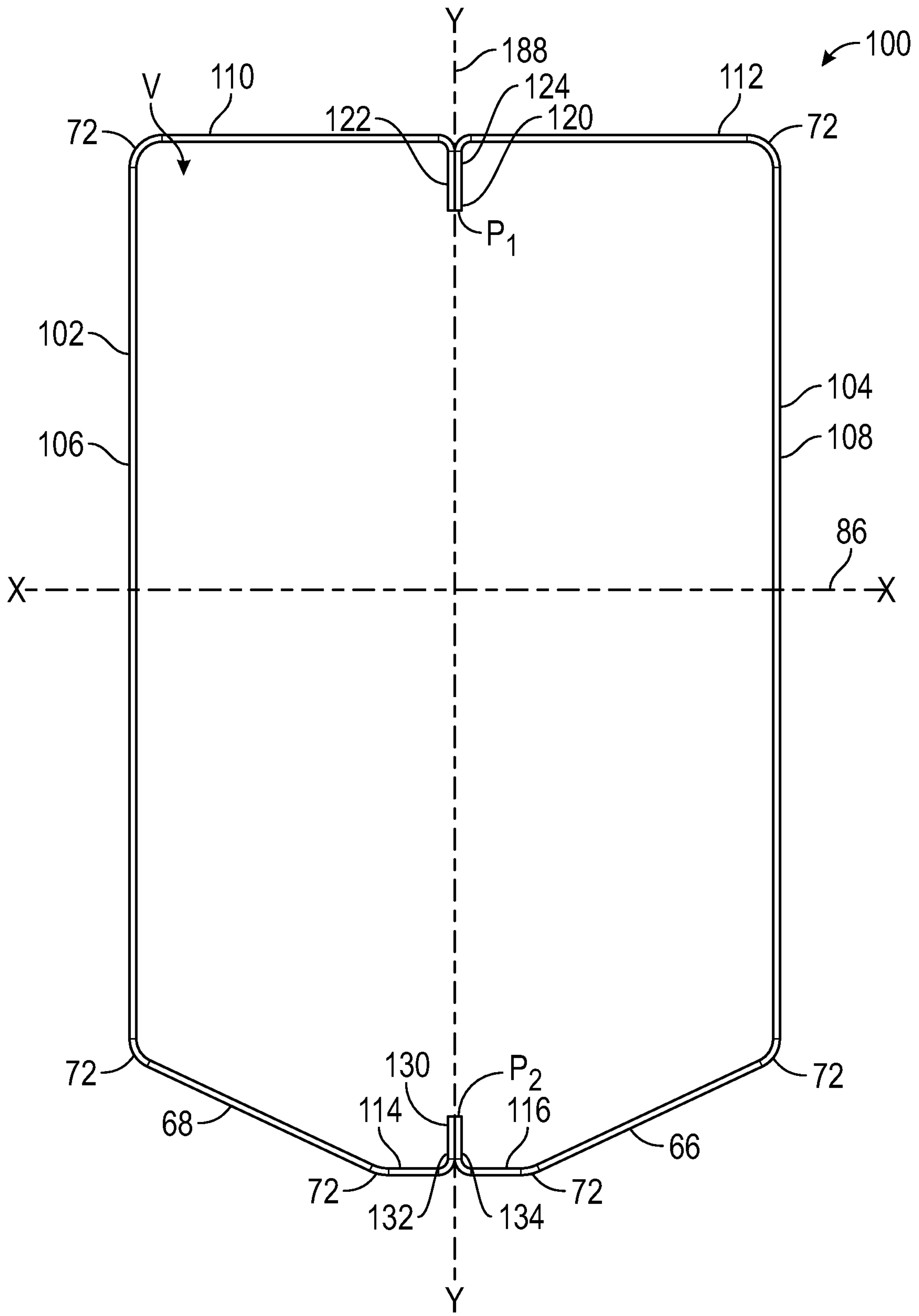
FIGS. 9-16 are front section views of boom sections of boom assemblies, according to various exemplary embodiments.

Referring to FIG. 9, a boom section 100 is shown according to an exemplary embodiment. In this embodiment, the boom section 100 includes a first shell, shown as left shell 102, and a second shell, shown as right shell 104. The left shell 102 includes a left sidewall, shown as sidewall 106 (e.g., acting as the combination of the sidewall 58 and the sidewall 64). The right shell 104 includes a right sidewall, shown as sidewall 108 (e.g., acting as the combination of the sidewall 56 and the sidewall 62). The left shell 102 and the right shell 104 include a top wall 110 and a top wall 112, respectively (e.g., together acting as the top wall 60). The left shell 102 and the right shell 104 include a bottom wall 114 and a bottom wall 116, respectively (e.g., together acting as the bottom wall 70). A first set of flanges 120, including a flange 122 and a flange 124 engaging one another along a contact plane $P_1$, couple the top wall 110 to the top wall 112. A second set of flanges 130, including a flange 132 and a flange 134 engaging one another along a contact plane $P_2$, couple the bottom wall 114 to the bottom wall 116. The first set of flanges 120 and the second set of flanges 130 extend into the enclosed volume V and are substantially aligned with the vertical neutral axis 88.

Figure 10:
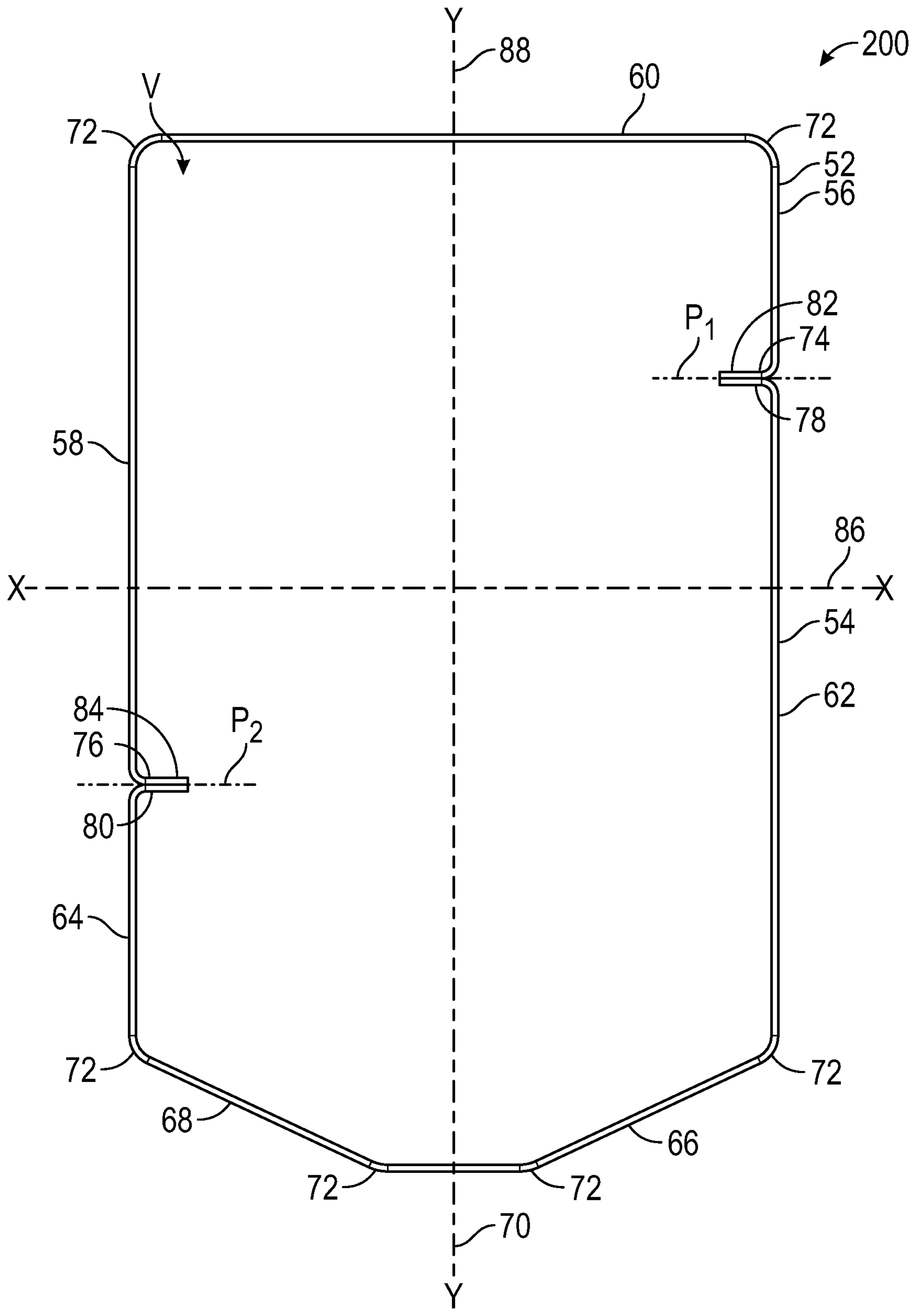
Figure 11:
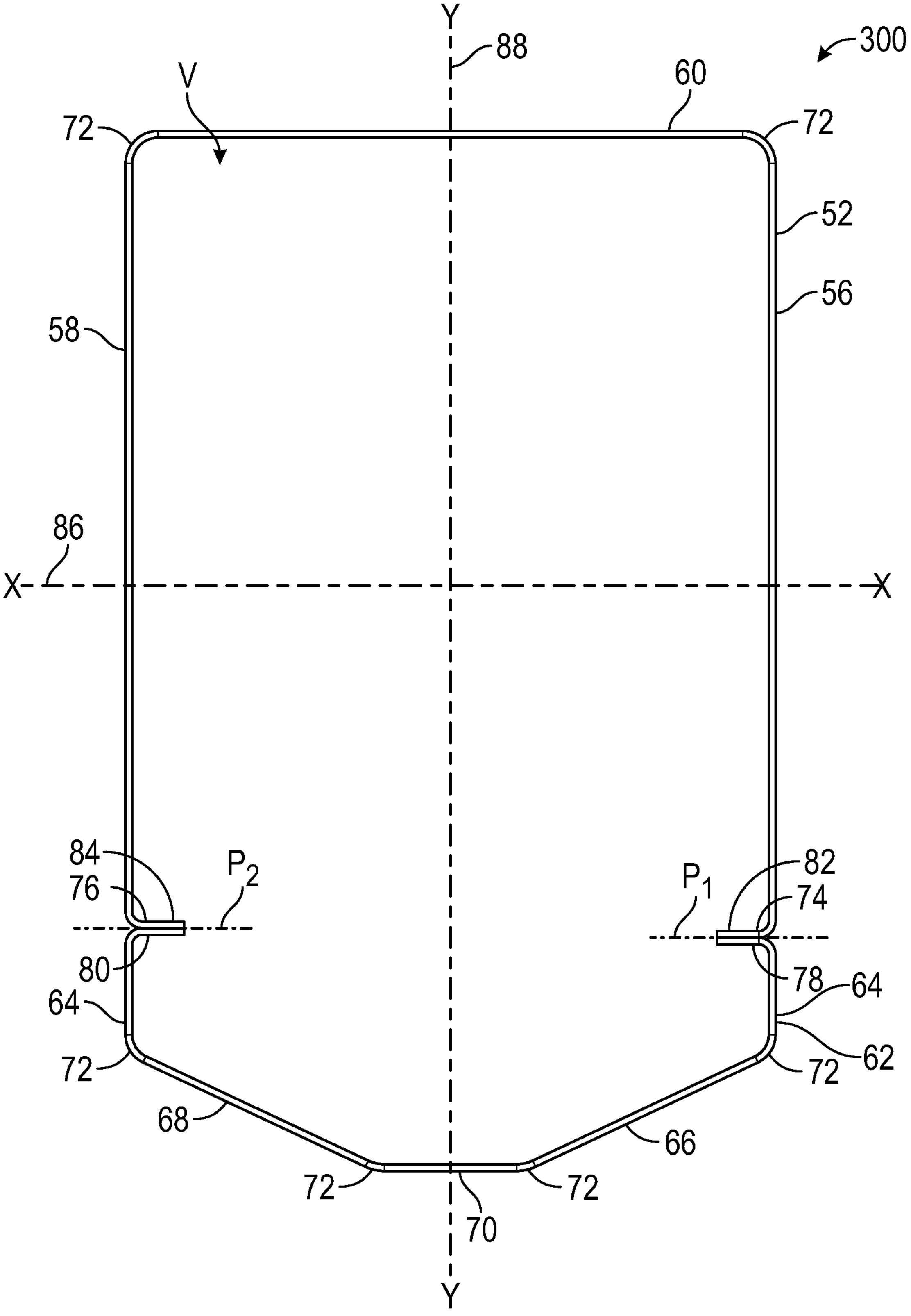

Referring to FIG. 10, a boom section 200 is shown according to an exemplary embodiment. In this embodiment, the first set of flanges 82 is offset above the horizontal neutral axis 86, and the second set of flanges 84 is offset below the horizontal neutral axis 86. The offset distance of each set of flanges from the horizontal neutral axis 86 may be equal or different. Referring to FIG. 11, a boom section 300 is shown according to an exemplary embodiment. In this embodiment, the first set of flanges 82 and the second set of flanges are both offset below the horizontal neutral axis 86.

The offset distance of each set of flanges from the horizontal neutral axis 86 may be equal or different. In another alternative embodiment, both sets of flanges are offset above the horizontal neutral axis 86.

Figure 12:
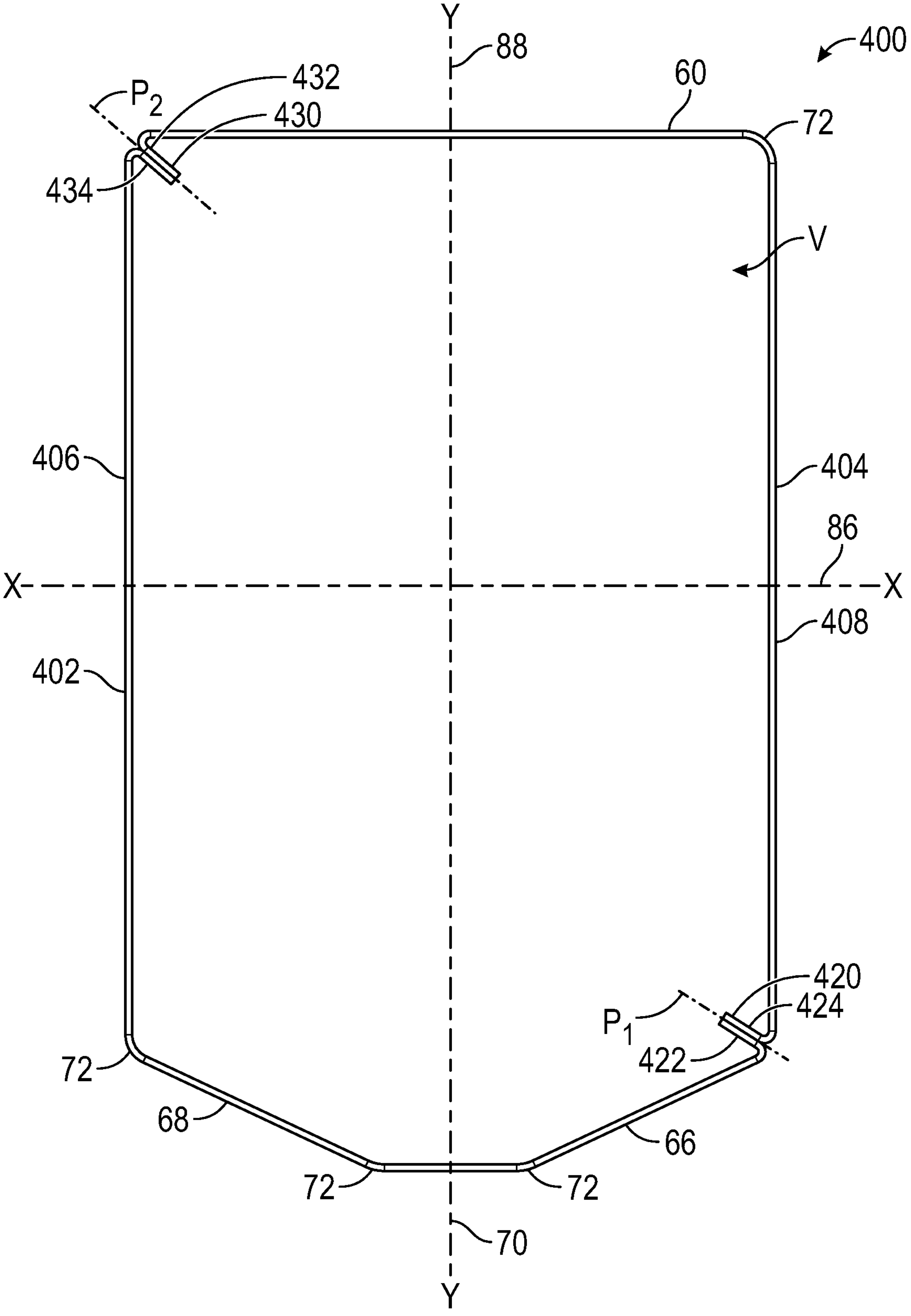

Referring to FIG. 12, a boom section 400 is shown according to an exemplary embodiment. In this embodiment, the boom section 400 includes a first shell, shown as left shell 402, and a second shell, shown as right shell 404. The left shell 402 includes a left sidewall, shown as sidewall 406 (e.g., acting as the combination of the sidewall 58 and the sidewall 64). The right shell 404 includes a right sidewall, shown as sidewall 408 (e.g., acting as the combination of the sidewall 56 and the sidewall 62). A first set of flanges 420, including a flange 422 and a flange 424 engaging one another along a contact plane $P_1$, couple the sidewall 408 to the angled sidewall 66. A second set of flanges 430, including a flange 432 and a flange 434 engaging one another along a contact plane $P_2$, couple the sidewall 406 to the top wall 60. The first set of flanges 420 and the second set of flanges 430 extend into the enclosed volume V. The first set of flanges 420 and the second set of flanges 430 are each angled relative to the horizontal neutral axis 86 and the vertical neutral axis 88 (e.g., at 45 degrees, etc.). In some embodiments, the contact plane $P_1$ is aligned with the contact plane $P_2$.

Figure 13:
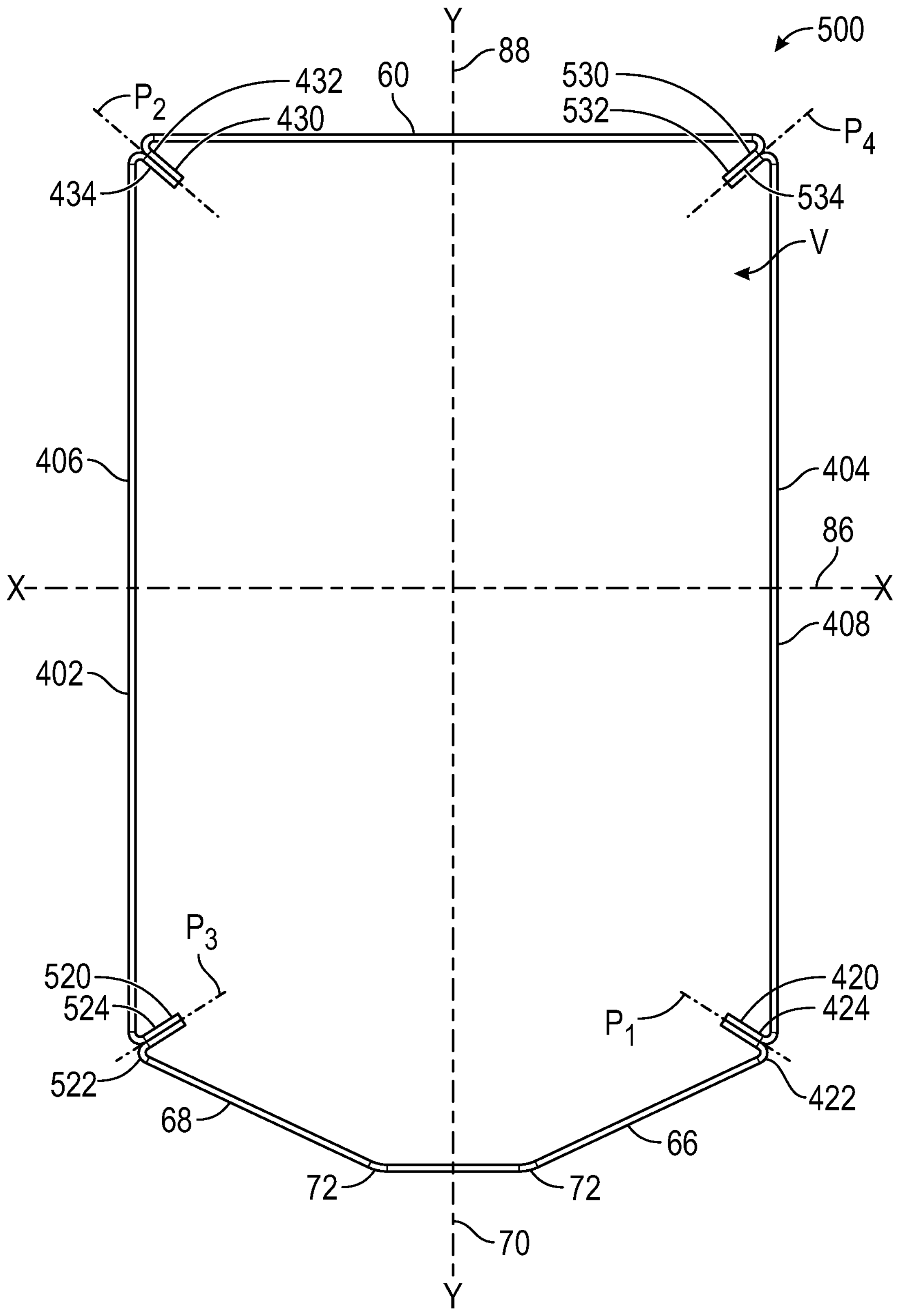

Referring to FIG. 13, a boom section 500 is shown according to an exemplary embodiment. The boom section 500 is substantially similar to the boom section 400 except the boom section 500 further includes a third set of flanges 520 and a fourth set of flanges 530. The third set of flanges 520, which includes a flange 522 and a flange 524 engaging one another along a contact plane $P_3$, couples the sidewall 406 to the angled sidewall 68. The fourth set of flanges 530, which includes a flange 532 and a flange 534 engaging one another along a contact plane $P_4$, couple the sidewall 408 to the top wall 60. The third set of flanges 520 and the fourth set of flanges 530 extend into the enclosed volume V. The third set of flanges 520 and the fourth set of flanges 530 are each angled relative to the horizontal neutral axis 86 and the vertical neutral axis 88 (e.g., 45 degrees, etc.). In some embodiments, the contact plane $P_3$ is aligned with the contact plane $P_4$.

Figure 14:
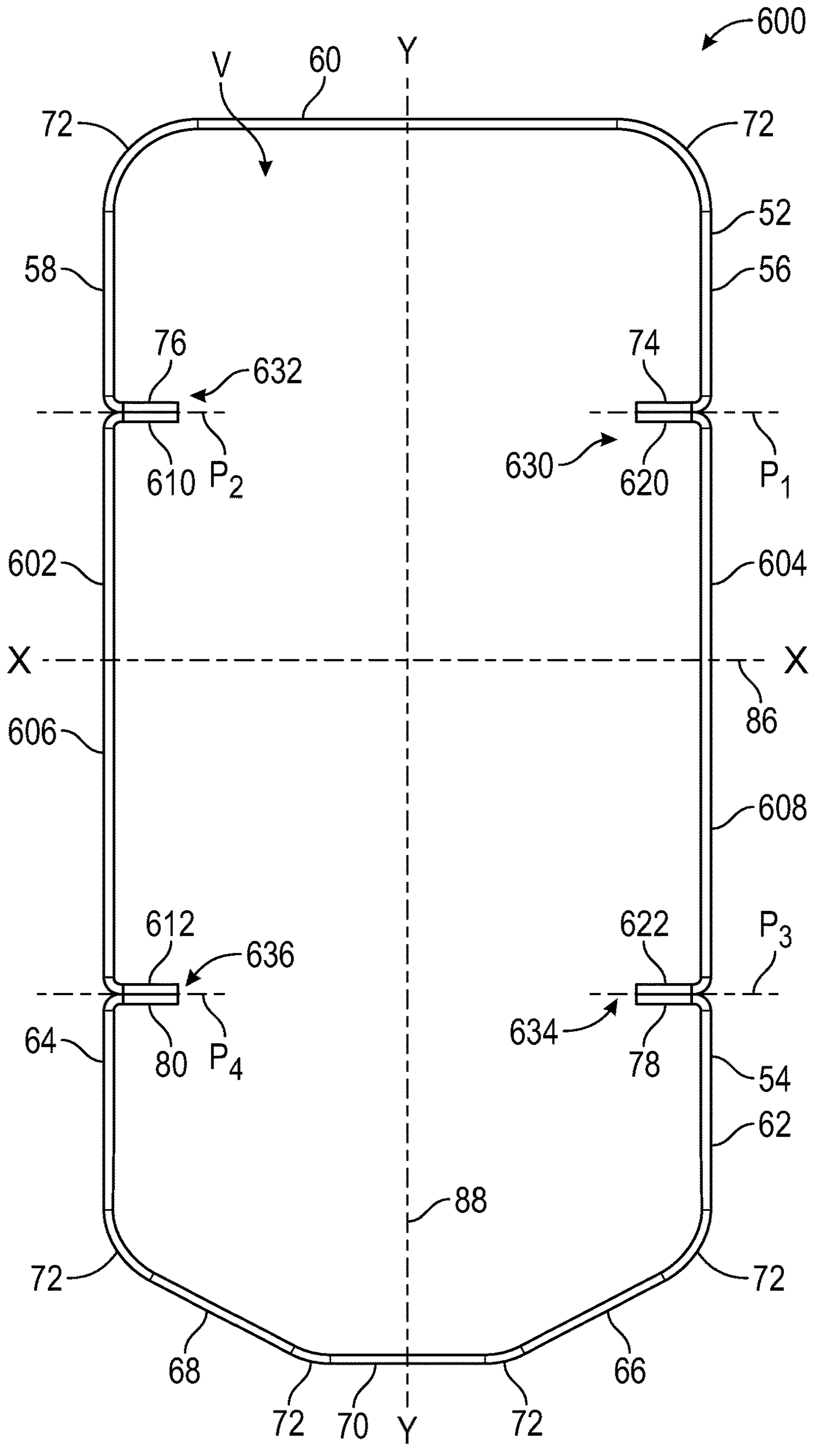

Referring to FIG. 14, a boom section 600 is shown according to an exemplary embodiment. In addition to the upper shell 52 and the lower shell 54, the boom section 600 further includes a pair of plates, spacers, or shells, shown as spacer 602 and spacer 604. Together, the upper shell 52, the lower shell 54, the spacer 602, and the spacer 604 define an enclosed volume V of the boom section 600. The spacer 602 includes a left sidewall, shown as sidewall 606. The spacer 604 includes a right sidewall, shown as sidewall 608. The sidewall 606 is flanked by a flange 610 and a flange 612. The sidewall 606, the flange 610, and the flange 612 together form a single, continuous piece. The sidewall 608 is flanked by a flange 620 and a flange 622. The sidewall 608, the flange 620, and the flange 622 together form a single, continuous piece. A first set of flanges 630, including the flange 74 and the flange 620, engage one another along a contact plane $P_1$ and couple the sidewall 608 to the sidewall 56. A second set of flanges 632, including the flange 76 and the flange 610, engage one another along a contact plane $P_2$ and couple the sidewall 606 to the sidewall 58. A third set of flanges 634, including the flange 78 and the flange 622, engage one another along a contact plane $P_3$ and couple the sidewall 608 to the sidewall 62. A fourth set of flanges 636, including the flange 80 and the flange 612, engage one another along a contact plane $P_4$ and couple the sidewall 606 to the sidewall 64. As shown the upper shell 52, the lower shell 54, the spacer 602, and the spacer 604 each have approximately the same thickness. In other embodiments, one or more of the upper shell 52, the lower shell 54, the spacer 602, and the spacer 604 have different thicknesses.

As shown, the spacer 602 and the spacer 604 are approximately the same size and shape. In other embodiments, the spacers have different sizes or shapes. In other embodiments, boom sections include more or fewer spacers. By way of example, two spacers in series with one another (i.e., a flange of one spacer is directly coupled to the flange of another spacer) on each side of the boom section may couple an upper shell to a lower shell.

Figure 15:
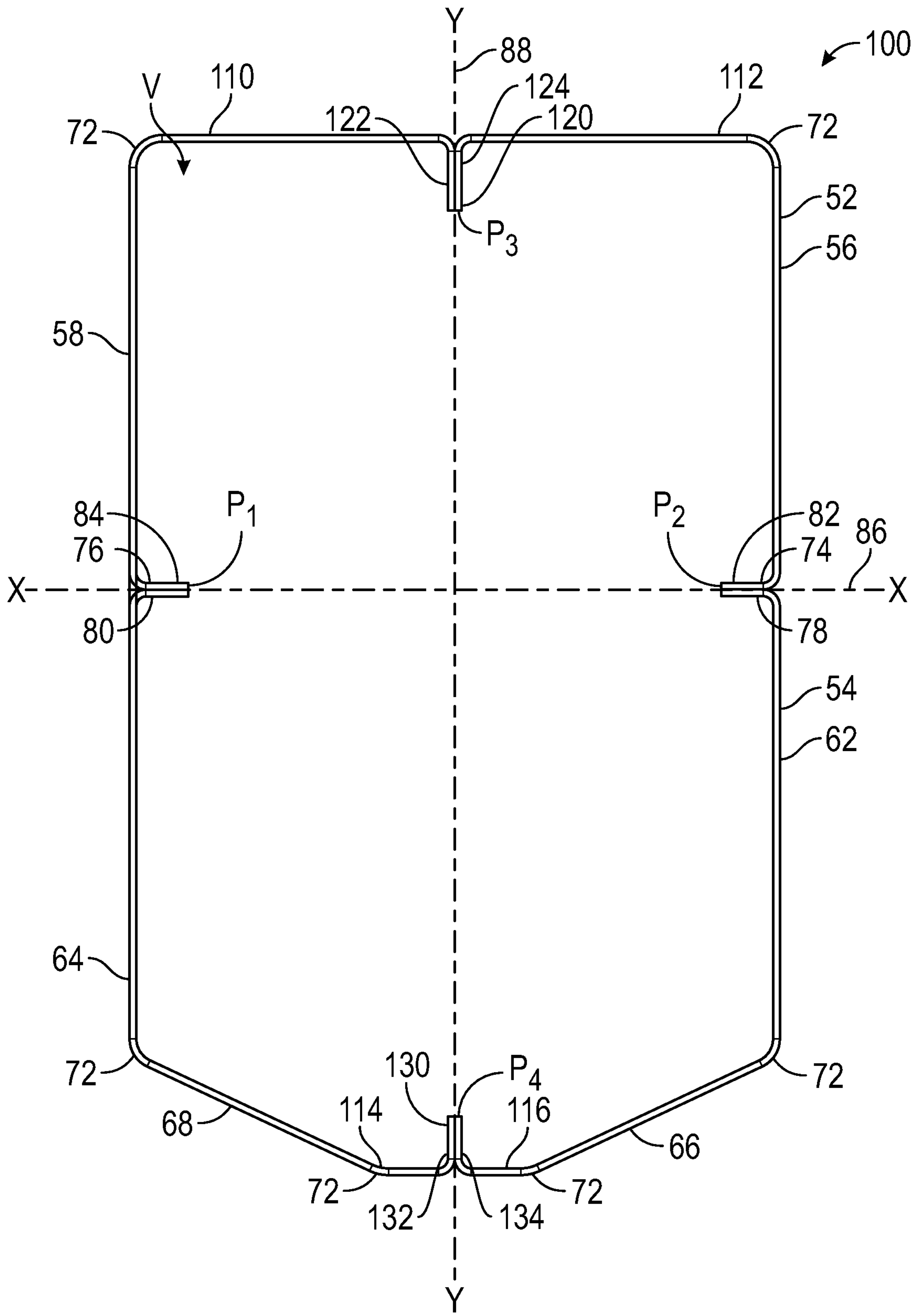

Referring to FIG. 15, a boom section 700 is shown according to an exemplary embodiment. In this embodiment, the boom section 700 includes the first set of flanges 82 and the second set of flanges 84 of FIG. 3, as well as the first set of flanges 120 and the second set of flanges 130 of FIG. 9. In this embodiment, the contact plane of the set of flanges 120 is referenced as contact plane $P_3$, and the contact plane of the set of flanges 130 is referenced as contact plane $P_4$.

Figure 16:
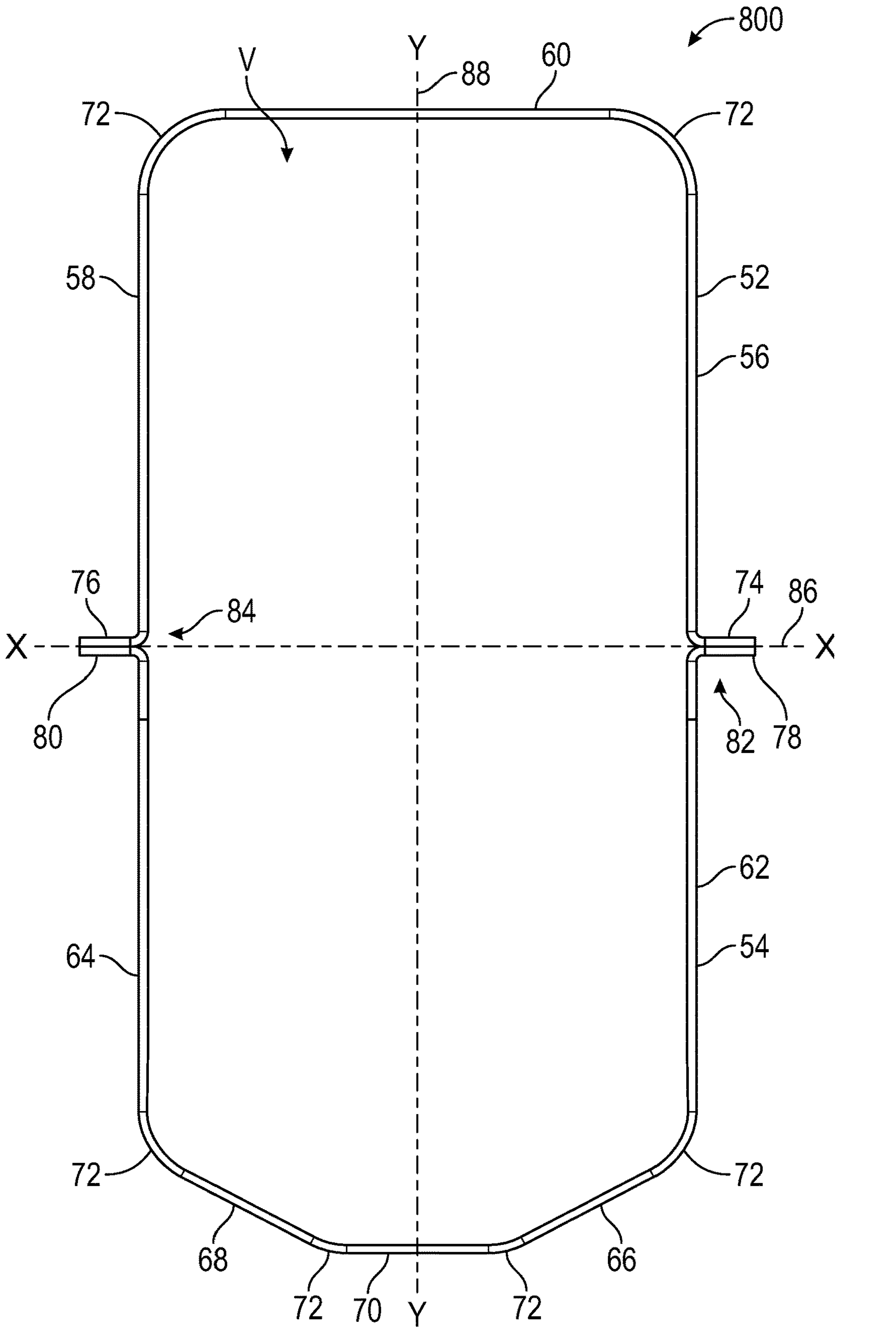

Referring to FIG. 16, a boom section 800 is shown according to an exemplary embodiment. In this embodiment, the first set of flanges 82 and the second set of flanges 84 extend outward from the sidewalls, away from the enclosed volume V. Accordingly, the first set of flanges 82 and the second set of flanges 84 are positioned externally in this embodiment.

Figure 17:
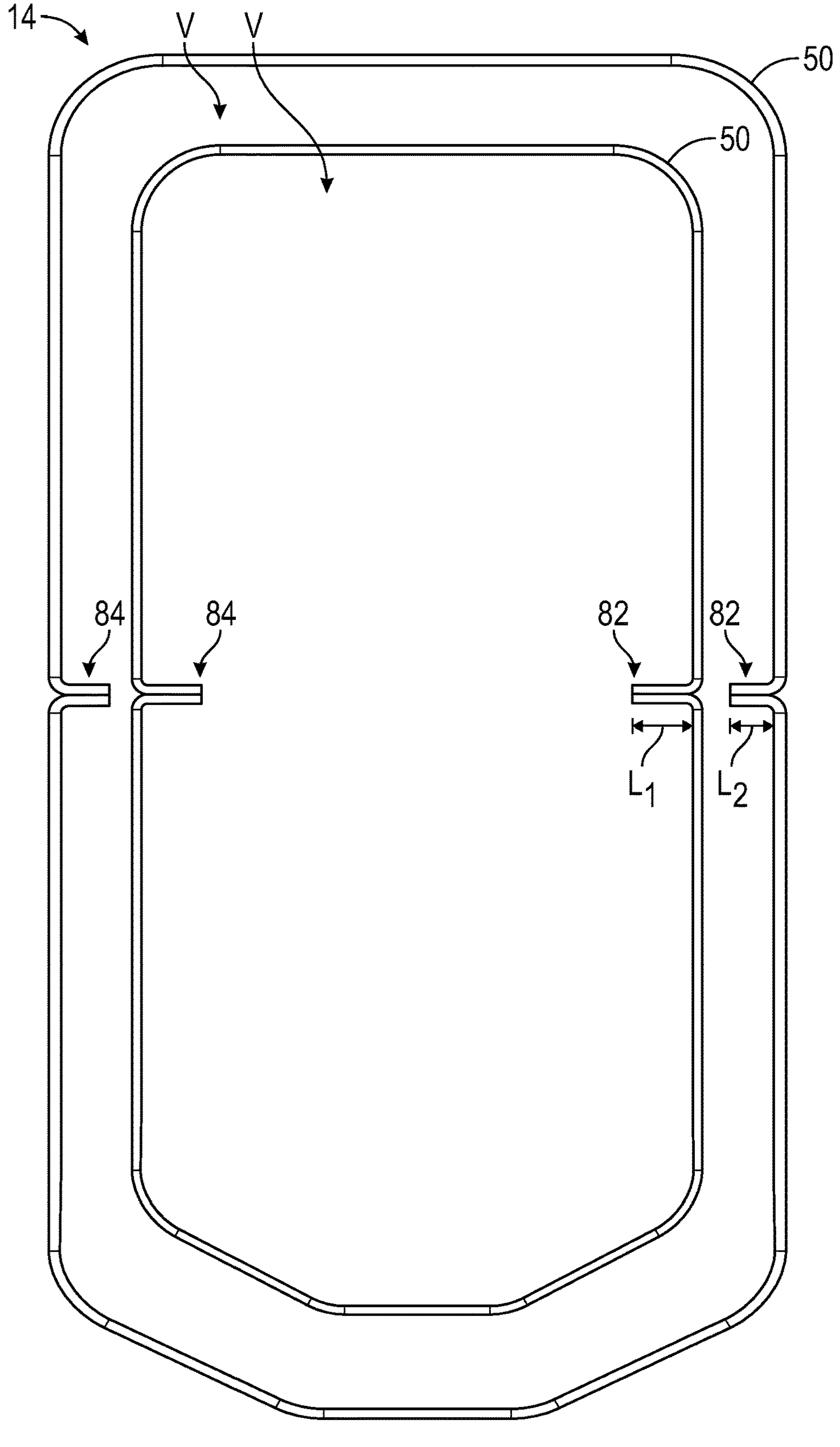
FIG. 17 is a front section view of a boom assembly, according to an exemplary embodiment.

Any of the boom sections described herein may be combined to form a telescoping boom assembly. Referring to FIG. 17, the boom 14 includes a pair of boom sections 50 (e.g., as shown in FIG. 3). One boom section 50 is at least partially contained within the enclosed volume V of the other boom section 50. To facilitate this arrangement, the inner boom section 50 is smaller than the outer boom section 50 (e.g., in width and height). Additionally, the wall thickness (i.e., the thickness of the material that forms the sidewalls) of the outer boom section 50 may be greater than that of the inner boom section 50 (e.g., to facilitate handling larger loads within the base boom section). As shown, the first sets of flanges 82 and the second sets of flanges 84 are substantially aligned with one another. This may be facilitated by having the flanges positioned internally in both boom sections 50 to prevent interference. This may also facilitate alignment of the neutral axes of the boom sections 50. A flange length $L_1$ is defined between the sidewalls of the inner boom section 50 and the ends of each corresponding flange. A flange length $L_2$ is defined between the sidewalls of the outer boom section 50 and the ends of each corresponding flange. As shown, the flange length $L_1$ is greater than the flange length $L_2$. In other embodiments, the flange length $L_1$ is less than or equal to the flange length $L_2$.

Figure 18:
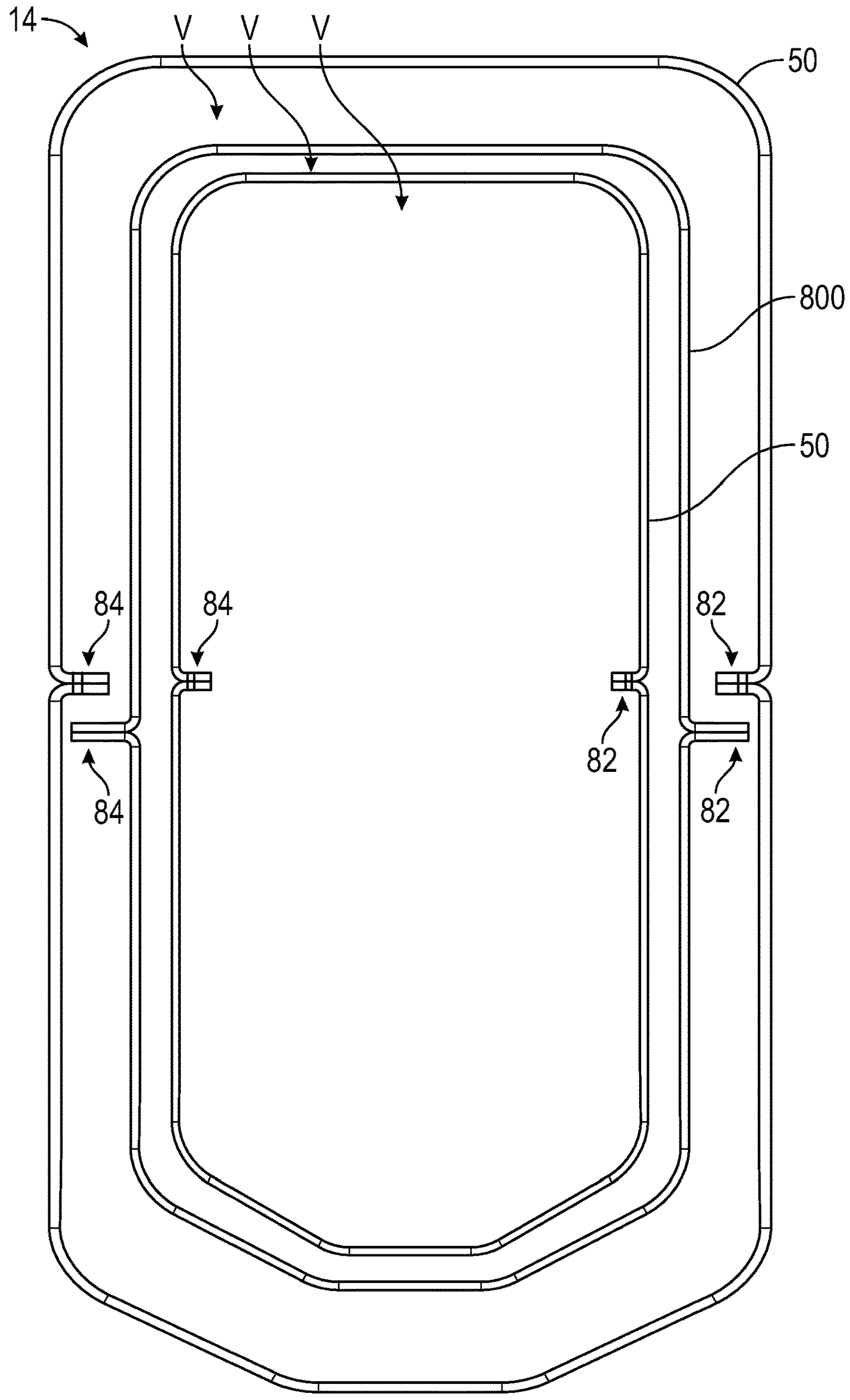
FIG. 18 is a front section view of a boom assembly, according to an exemplary embodiment.

Referring to FIG. 18, the boom 14 includes a pair of boom sections 50 (e.g., as shown in FIG. 3) and a boom section 800 (e.g., as shown in FIG. 16). An inner boom section 50 is at least partially contained within the enclosed volume V of the boom section 800. The boom section 800 is at least partially contained within the enclosed volume V of an outer boom section 50. In this embodiment, the sets of flanges of the boom sections 50 are substantially aligned. The sets of flanges of the boom section 800 are vertically offset from the sets of flanges of the boom sections 50. Because the boom sections 50 have internal flanges and the boom section 800 has external flanges, this may facilitate locating the sidewalls of the boom section 800 closer to the sidewalls of the outer boom section 50. By way of example, the first set of flanges 82 of the outer boom section 50 is offset above the first set of flanges 82 of the boom section 800. In other embodiments, the first set of flanges 82 of the outer boom section 50 is offset below the first set of flanges 82 of the boom section 800. This prevents interference between the sets of flanges that would occur if the flanges were located at the same vertical position, permitting the adjacent sidewalls to be moved closer to one another.

Figure 19:
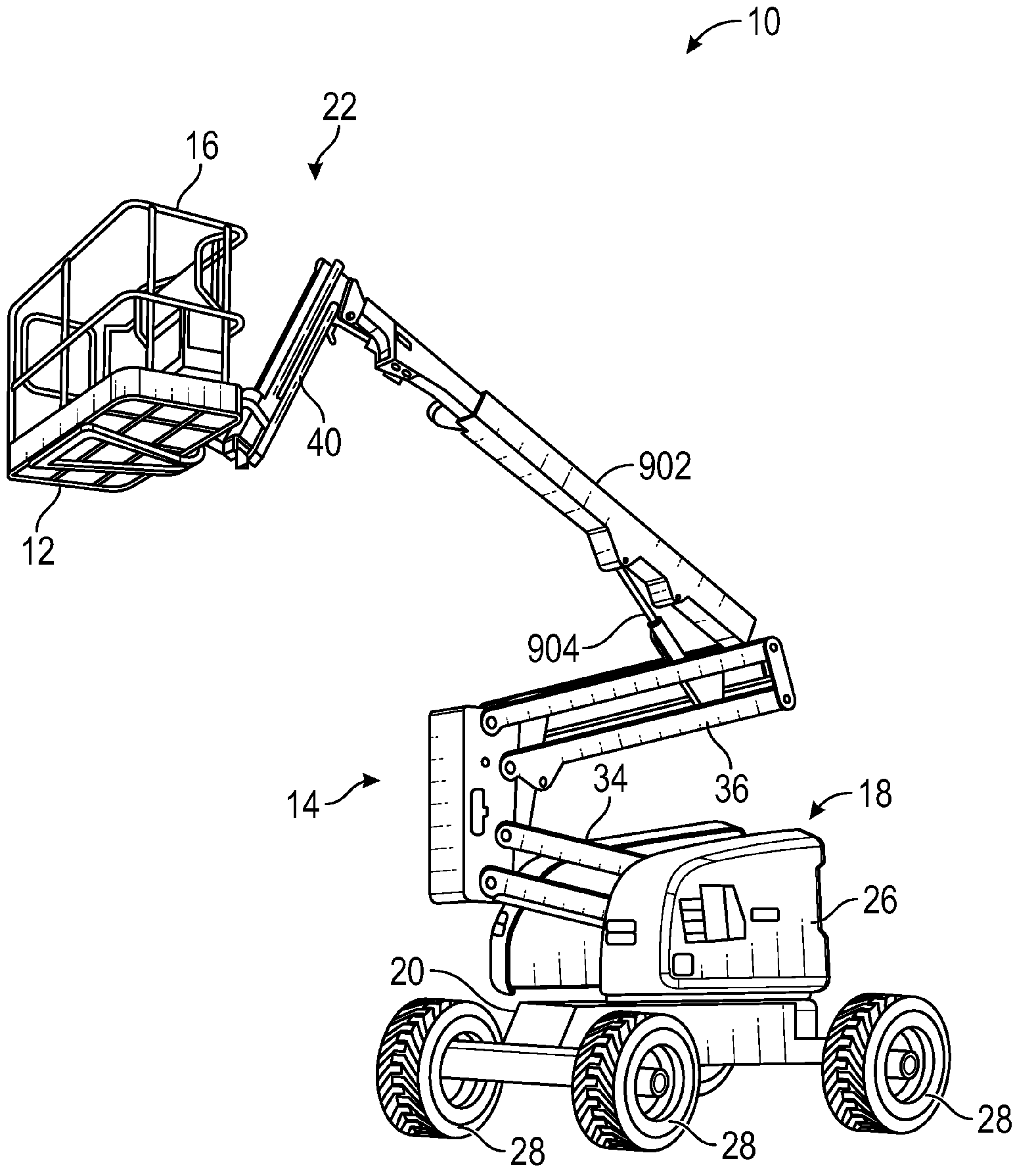
FIG. 19 is a perspective view of a lift device including a jib boom assembly, according to an exemplary embodiment.

Referring to FIG. 19, the lift device 10 is shown according to an exemplary embodiment. In this embodiment, the boom 14 includes the base boom section 34, the intermediate boom section 36, and the jib boom section 902. A lift actuator, shown as hydraulic cylinder 904, is coupled between the intermediate boom section 34 and the jib boom section 902. According to an exemplary embodiment, the hydraulic cylinder 904 extends or retracts to raise or lower the boom 14 (e.g., to rotate the distal end 22 of the boom 14 relative to the turntable 26).

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the lift device 10 as shown in the various exemplary embodiments is illustrative only. Additionally, any element disclosed in one embodiment may be incorporated or utilized with any other embodiment disclosed herein. For example, the boom section 100 of the exemplary embodiment shown in at least FIG. 9 may be incorporated in the lift device 10 of the exemplary embodiment shown in at least FIG. 1. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A lift device, comprising:
a chassis;
a plurality of tractive elements coupled to the chassis; and
a boom configured to couple an implement to the chassis, the boom comprising:
a first boom section comprising:
a first shell including a first sidewall and a first transition coupling a first flange to the first sidewall; and
a second shell including a second sidewall and a second transition coupling a second flange to the second sidewall, wherein the first flange and the second flange engage one another along a first contact plane; and
a second boom section moveable relative to the first boom section to extend the boom, the second boom section comprising:
a third shell including a third sidewall and a third flange coupled to the third sidewall; and
a fourth shell including a fourth sidewall and a fourth flange coupled to the fourth sidewall, wherein the third flange and the fourth flange engage one another along a second contact plane,
wherein the first transition and the second transition extend along a length of the boom, wherein the first transition and the second transition at least partially define a channel, and wherein the first shell is coupled to the second shell by a weld positioned within the channel;
wherein the first shell and the second shell at least partially define a first enclosed volume, and wherein the first flange and the second flange extend inward toward the first enclosed volume, and wherein the first contact plane is offset from the second contact plane;
wherein the third shell and the fourth shell at least partially define a second enclosed volume, and wherein the third flange and the fourth flange extend away from the second enclosed volume; and
wherein one of (a) the second boom section is received within the first enclosed volume of the first boom section or (b) the first boom section is received within the second enclosed volume of the second boom section.

2. The lift device of claim 1, wherein at least one of the first transition and the second transition is curved or includes a flat portion.

3. The lift device of claim 1, wherein the first shell further includes a fifth flange, wherein the second shell further includes a sixth flange, and wherein the fifth flange is coupled to the sixth flange.

4. The lift device of claim 3, wherein the fifth flange and the sixth flange extend inward toward the first enclosed volume.

5. The lift device of claim 3, wherein the fifth flange is substantially aligned with the first flange.

6. The lift device of claim 5, wherein the first flange and the fifth flange extend horizontally.

7. The lift device of claim 3, wherein the fifth flange engages the sixth flange along a third contact plane, and wherein the first contact plane is aligned with the third contact plane.

8. The lift device of claim 7, wherein the first contact plane and the third contact plane are aligned with a neutral axis of the first boom section.

9. The lift device of claim 3, wherein the fifth flange and the sixth flange extend toward the first flange and the second flange.

10. The lift device of claim 1, wherein the first contact plane is vertically offset from the second contact plane.

11. The lift device of claim 1, wherein the second boom section is received within the first enclosed volume of the first boom section.

12. The lift device of claim 1, wherein the first boom section is received within the second enclosed volume.

13. The lift device of claim 1, wherein the first sidewall extends away from the first contact plane in a first direction, wherein the second sidewall extends away from the first contact plane in a second direction opposite the first direction, and wherein the first shell is fixedly coupled to the second shell along the first contact plane.

14. A lift device, comprising:
- a chassis;
- a plurality of tractive elements coupled to the chassis; and
- a boom configured to couple an implement to the chassis, the boom comprising:
  - a first boom section comprising:
    - a first shell including a first sidewall and a first set of flanges coupled to the first sidewall, the first set of flanges comprising:
      - a first flange; and
      - a second flange; and
    - a second shell including a second sidewall and a second set of flanges coupled to the second sidewall, the second set of flanges comprising:
      - a third flange abutting the first flange along a first contact plane; and
      - a fourth flange abutting the second flange,
  - a second boom section moveable relative to the first boom section, the second boom section comprising:
    - a third shell including a third sidewall and a fifth flange coupled to the third sidewall; and
    - a fourth shell including a fourth sidewall and a sixth flange coupled to the fourth sidewall and abutting the fifth flange along a second contact plane,
- wherein the first shell is coupled to the second shell such that the first sidewall and the second sidewall at least partially define an enclosed volume, wherein the first set of flanges and the second set of flanges at least partially define a channel, wherein the first set of flanges and the second set of flanges extend away from the enclosed volume, and wherein the first contact plane is offset from the second contact plane.

15. The lift device of claim 14, wherein the first contact plane is vertically offset from the second contact plane.

16. The lift device of claim 14, wherein the enclosed volume is a first enclosed volume, wherein the third shell and the fourth shell at least partially define a second enclosed volume, and wherein the fifth flange and the sixth flange extend away from into the second enclosed volume.

17. The lift device of claim 16, wherein the second boom section is received within the first enclosed volume of the first boom section.

18. The lift device of claim 14, wherein the first flange, the second flange, and the first sidewall are formed from a single, continuous piece of material.

19. A lift device, comprising:
- a chassis;
- a plurality of tractive elements coupled to the chassis; and
- a boom configured to couple an implement to the chassis, the boom comprising:
  - a first boom section comprising:
    - a first shell including a first sidewall and a first flange coupled to the first sidewall; and
    - a second shell including a second sidewall and a second flange coupled to the second sidewall and abutting the first flange; and
  - a second boom section moveable relative to the first boom section, the second boom section comprising:
    - a third shell including a third sidewall and a third flange coupled to the third sidewall; and
    - a fourth shell including a fourth sidewall and a fourth flange coupled to the fourth sidewall and abutting the third flange,
- wherein the first sidewall and the second sidewall at least partially define a first enclosed volume that receives the second boom section, wherein the third sidewall and the fourth sidewall at least partially define a second enclosed volume, wherein the first flange and the second flange extend into the first enclosed volume, and wherein the third flange and the fourth flange extend away from the second enclosed volume.

20. The lift device of claim 19, wherein the third flange extends substantially perpendicular to the third sidewall.

* * * * *